US010471986B2

(12) United States Patent
Nguyen et al.

(10) Patent No.: US 10,471,986 B2
(45) Date of Patent: Nov. 12, 2019

(54) MOVABLE RIG AND STEERING SYSTEM

(71) Applicant: Dreco Energy Services ULC, Edmonton (CA)

(72) Inventors: Van Hy Nguyen, Edmonton (CA); Roman Konowalec, Edmonton (CA); Donald Leonard Burlet, Edmonton (CA); Kameron Wayne Konduc, Edmonton (CA); Timothy H. Watson, Leduc (CA); Bogdan Bodnar, Edmonton (CA)

(73) Assignee: DRECO ENERGY SERVICES ULC, Calgary (CA)

( * ) Notice: Subject to any disclaimer, the term of this patent is extended or adjusted under 35 U.S.C. 154(b) by 242 days.

(21) Appl. No.: 15/285,946

(22) Filed: Oct. 5, 2016

(65) Prior Publication Data

US 2018/0093705 A1    Apr. 5, 2018

(51) Int. Cl.
| | |
|---|---|
| *B62D 51/06* | (2006.01) |
| *B62D 7/02* | (2006.01) |
| *E21B 15/00* | (2006.01) |
| *E21B 7/02* | (2006.01) |
| *B62D 7/04* | (2006.01) |
| *B62D 7/15* | (2006.01) |
| *B60G 3/00* | (2006.01) |

(52) U.S. Cl.
CPC ............... *B62D 7/026* (2013.01); *B60G 3/00* (2013.01); *B62D 7/04* (2013.01); *B62D 7/1509* (2013.01); *E21B 7/02* (2013.01); *E21B 15/00* (2013.01); *B60G 2300/37* (2013.01)

(58) Field of Classification Search
CPC ...... B60G 3/00; B60G 2300/37; B62D 7/026; B62D 7/1509; B62D 7/04; E21B 7/02; E21B 15/00
USPC .......................................... 180/167, 8.5, 8.6
See application file for complete search history.

(56) References Cited

U.S. PATENT DOCUMENTS

| | | |
|---|---|---|
| 3,421,596 A | 1/1969 | Christenson et al. |
| 3,502,166 A | 3/1970 | Christenson et al. |
| 4,324,077 A | 4/1982 | Woolslayer |

(Continued)

FOREIGN PATENT DOCUMENTS

WO    WO-2018064746 A1    4/2018

OTHER PUBLICATIONS

"Ackerman steering geometry", Wikipedia. Accessed on the Internet Jan. 11, 2017 URL:<https://en.wikipedia.org/wiki/Ackermann_steering_geometry> (3 pages).

(Continued)

*Primary Examiner* — Toan C To
(74) *Attorney, Agent, or Firm* — Schwegman Lundberg & Woessner, P.A.

(57) ABSTRACT

A drill rig with a steering system may include a substructure having a wheelhouse, a drill floor arranged atop the substructure, a mast extending upwardly and above the drill floor, and a steering system arranged within the wheelhouse. The steering system may include a wheel assembly comprising an electric motor configured for driving rotational motion of a wheel, a deployment device configuring for deploying the wheel assembly to carry the drill rig, and a steering mechanism configured for selective engagement with the wheel assembly and rotating the wheel assembly.

18 Claims, 24 Drawing Sheets

(56) References Cited

U.S. PATENT DOCUMENTS

| | | | |
|---|---|---|---|
| 4,387,814 A | 6/1983 | Beduhn et al. | |
| 4,823,870 A | 4/1989 | Sorokan | |
| 6,054,829 A | 4/2000 | Young et al. | |
| 6,148,940 A | 11/2000 | Hokanson et al. | |
| 6,234,527 B1 | 5/2001 | Poulin et al. | |
| 6,286,615 B1* | 9/2001 | Bitelli | B62D 7/026 180/411 |
| 7,624,831 B2* | 12/2009 | Orr | E21B 15/045 173/184 |
| 7,950,478 B2 | 5/2011 | Terry | |
| 9,091,125 B2* | 7/2015 | Konduc | E21B 15/00 |
| 9,463,833 B2* | 10/2016 | Smith | E21B 15/003 |
| RE46,723 E* | 2/2018 | Smith | |
| 9,926,719 B2* | 3/2018 | Reddy | E21B 15/003 |
| 2004/0240973 A1* | 12/2004 | Andrews | E21B 7/02 414/332 |
| 2009/0283324 A1* | 11/2009 | Konduc | E21B 7/02 175/57 |
| 2014/0331570 A1 | 11/2014 | Fullerton et al. | |
| 2015/0122558 A1* | 5/2015 | Van Raden | B62D 57/032 180/8.1 |
| 2016/0052441 A1* | 2/2016 | Korach | B60P 1/02 414/495 |
| 2018/0093706 A1 | 4/2018 | Nguyen et al. | |

OTHER PUBLICATIONS

"Axles & Suspension Wheeled Moving System", Columbia Industries. Accessed on the Internet Jan. 11, 2017 URL:<http://www.joomag.com/magazine/columbia-industries/0320299001391629028> (4 pages).

"Axles and Suspension", Columbia Industries. Updated Mar. 17, 2016, accessed on the Internet Jan. 11, 2017 URL:<http://www.columbiacorp.com/axlesandsuspension.php> (2 pages).

"Entro Heavy Haul", Entro Industries. Accessed on the Internet Jan. 11, 2017 URL:<https://entro-eng.com/products/heavy-haul/heavy-haul-overview/> (2 pages).

"Nabors Oil Rig Move", YouTube. Uploaded Oct. 22, 2008, accessed on the Internet Jan. 11, 2017 URL:<https://www.youtube.com/watch?v=T4ELOeh6R6M> (2 pages).

"Pin-on Walkers for Ideal® Rigs", Entro Industries. Accessed on the Internet Jan. 11, 2017 URL:<https://entro-eng.com/products/walking-systems/ideal-pin-on-walkers/> (2 pages).

"Steering", Wikipedia. Accessed on the Internet Jan. 11, 2017.

Entro Industries Homepage. Accessed on the Internet Jan. 11, 2017 URL:<https://entro-eng.com/> (2 pages).

"International Search Report and Written Opinion for related PCT Application No. PCT/CA2017/000215 dated Jan. 2018 (11 pages)."

"U.S. Appl. No. 15/349,661, Notice of Allowance dated Jan. 3, 2019", 8 pgs.

"U.S. Appl. No. 15/349,661, Response filed Oct. 26, 2018 to Restriction Requirement dated Aug. 28, 2018", 6 pgs.

"U.S. Appl. No. 15/349,661, Restriction Requirement dated Aug. 28, 2018", 5 pgs.

"International Application Serial No. PCT/CA2017/000215, International Preliminary Report on Patentability dated Jan. 21, 2019", 5 pgs.

\* cited by examiner

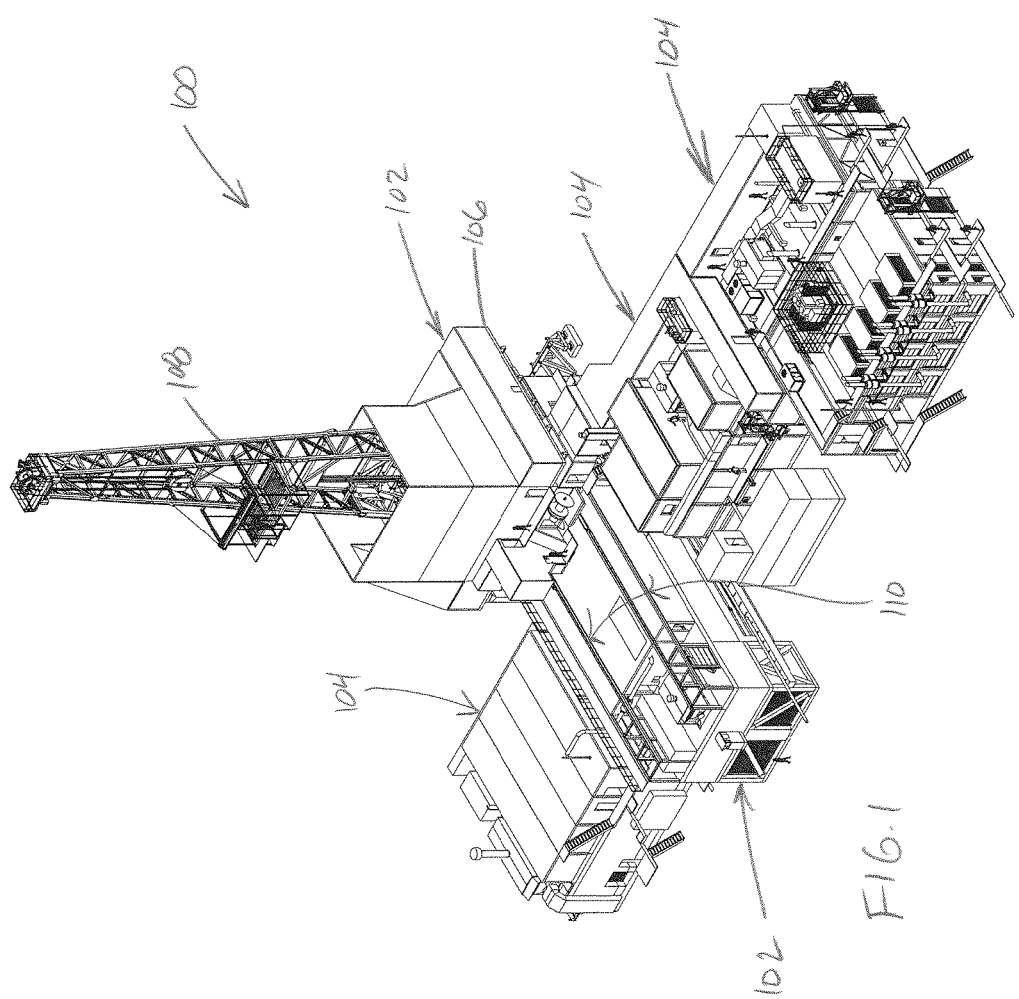

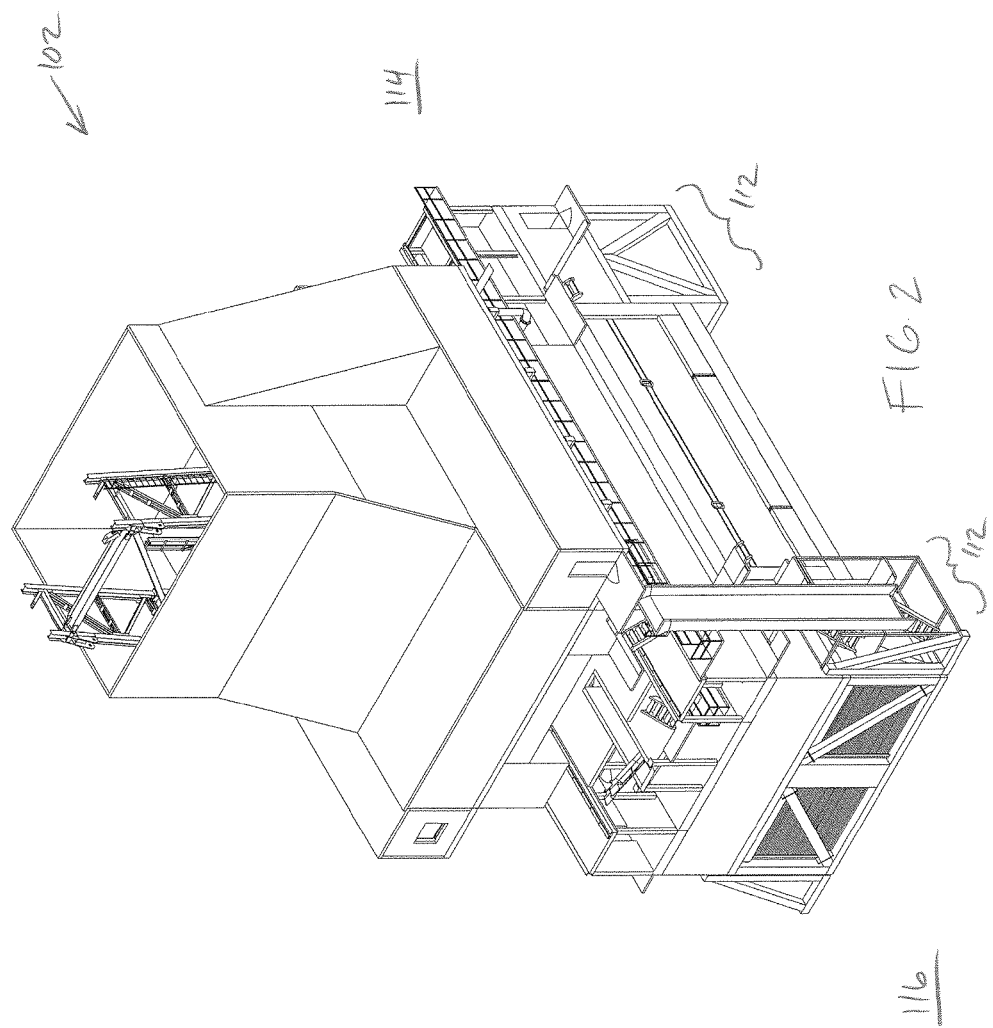

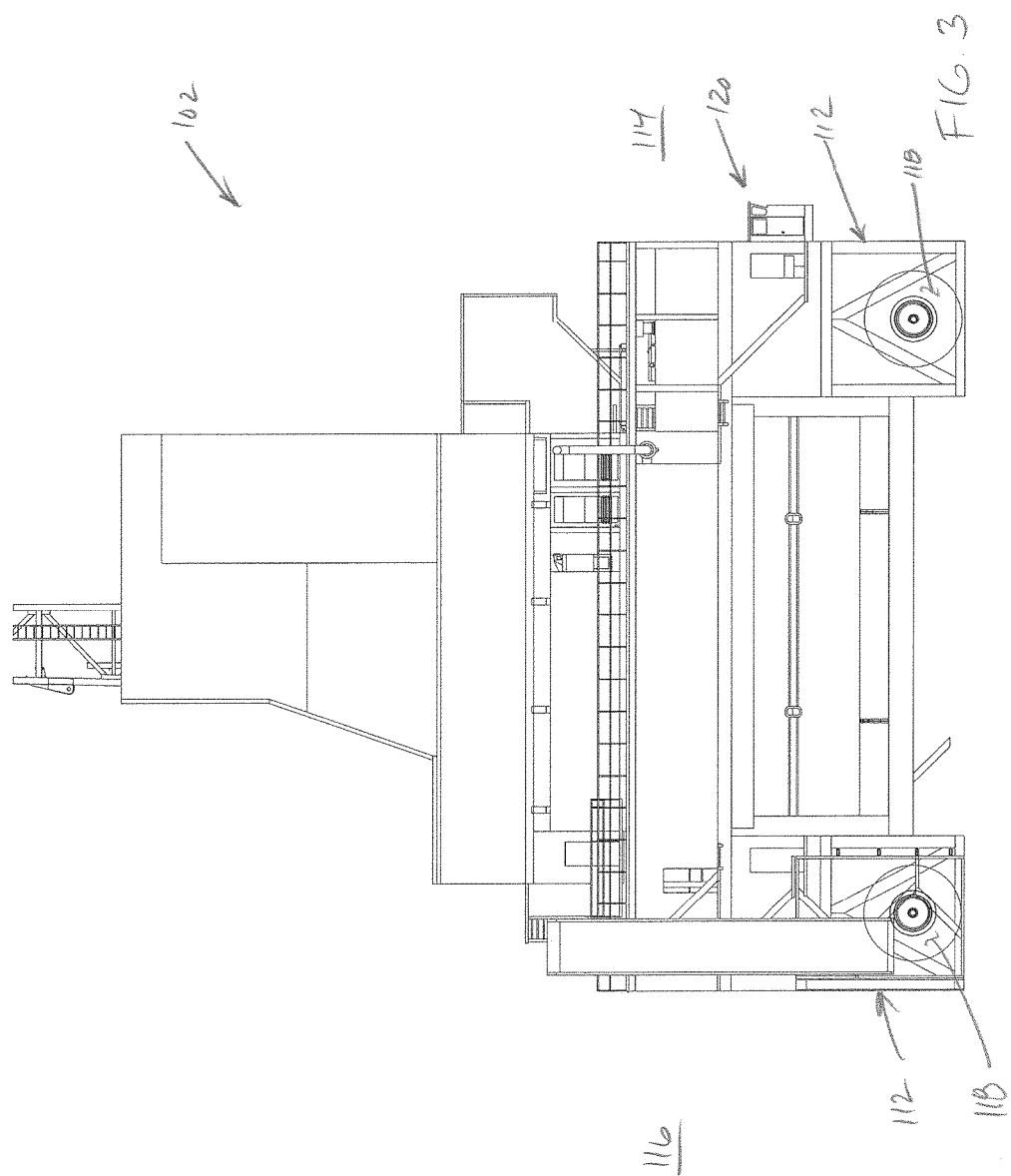

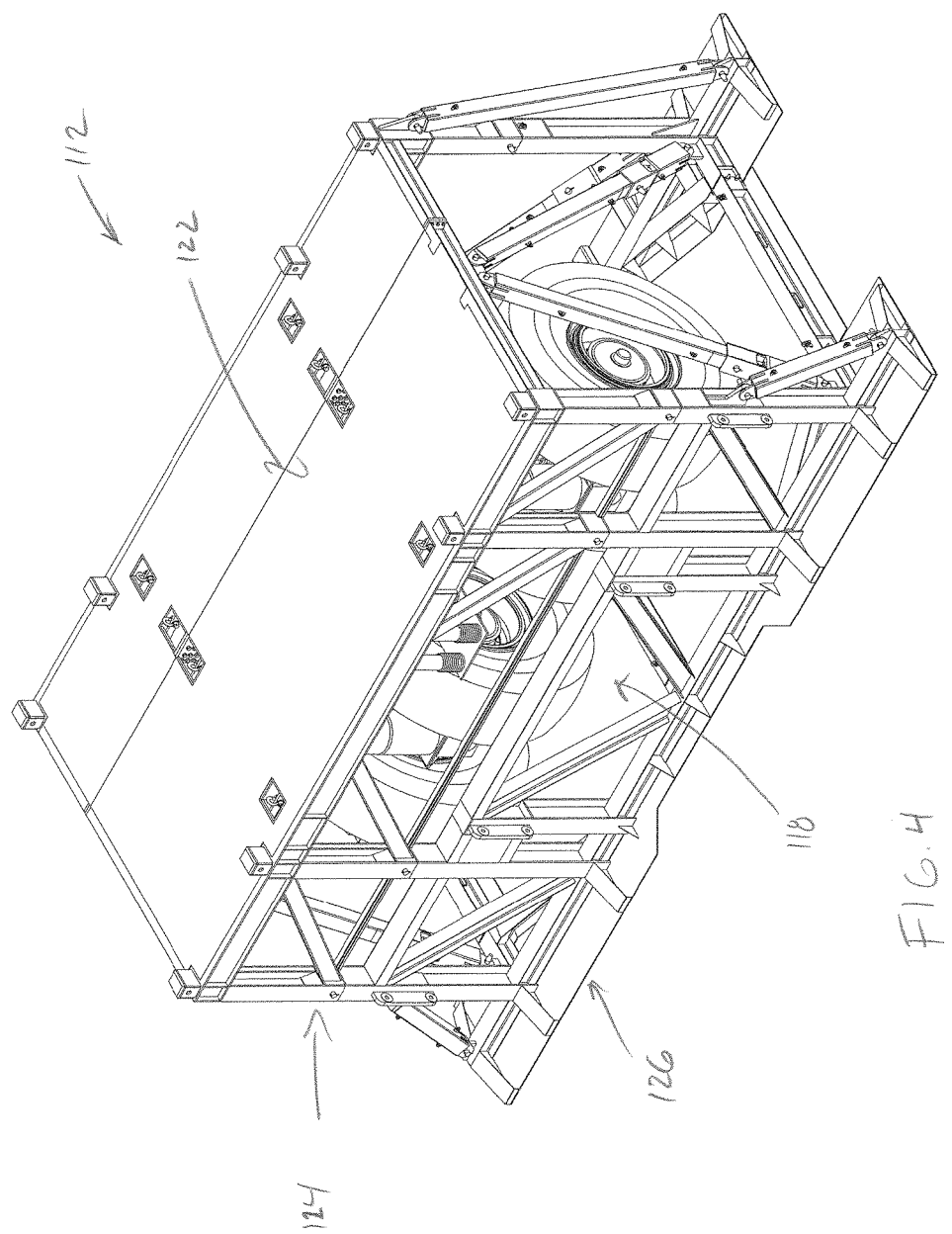

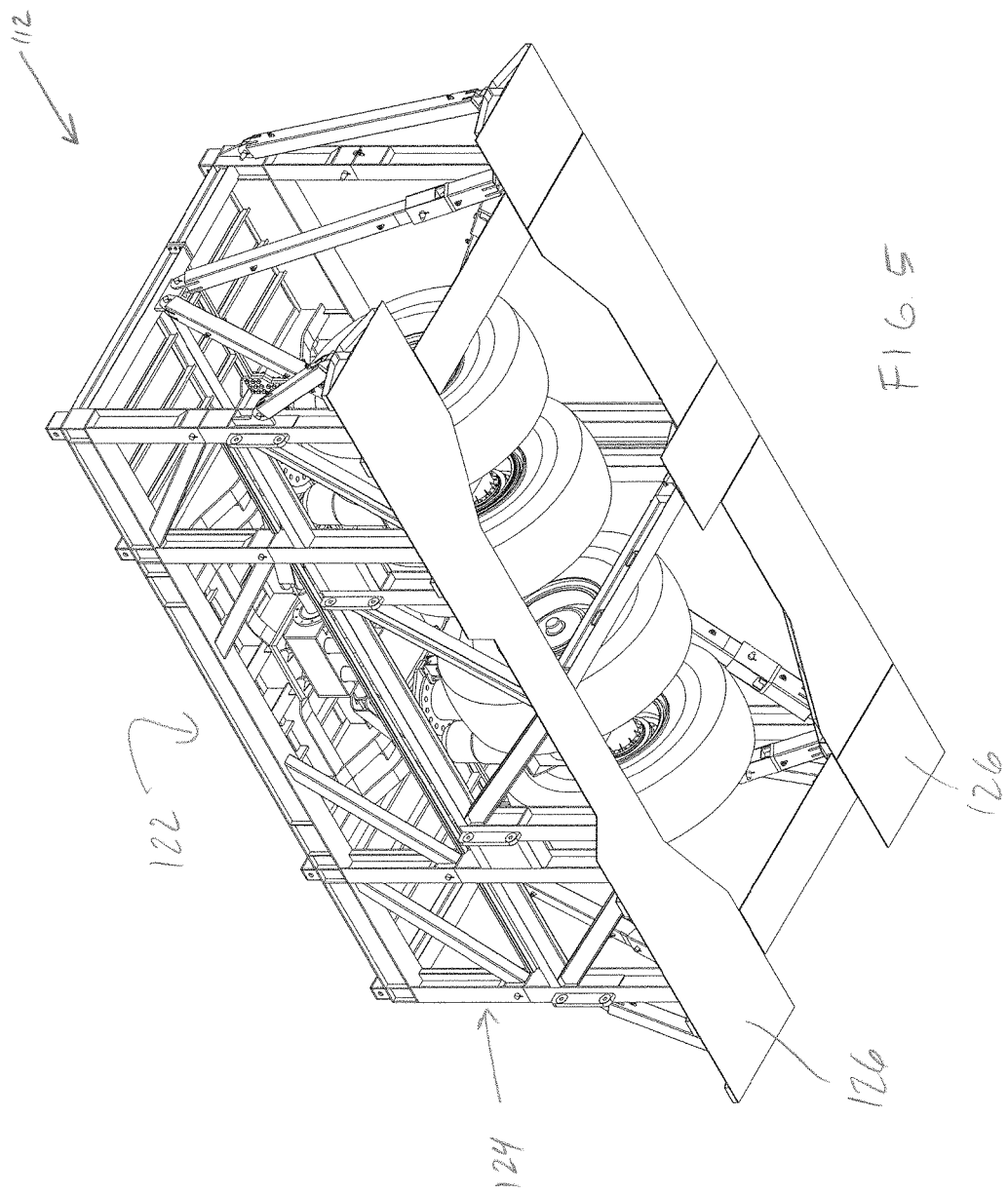

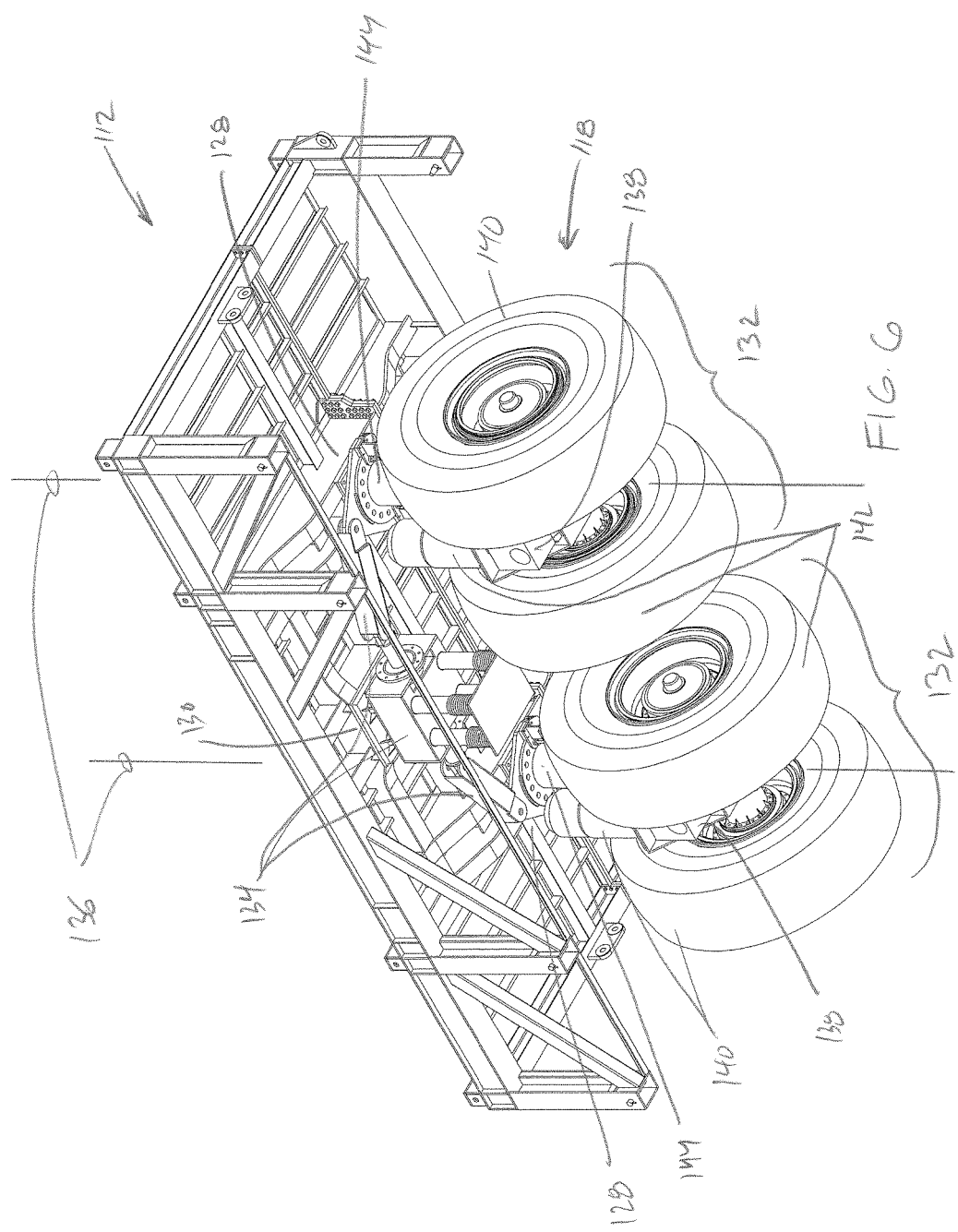

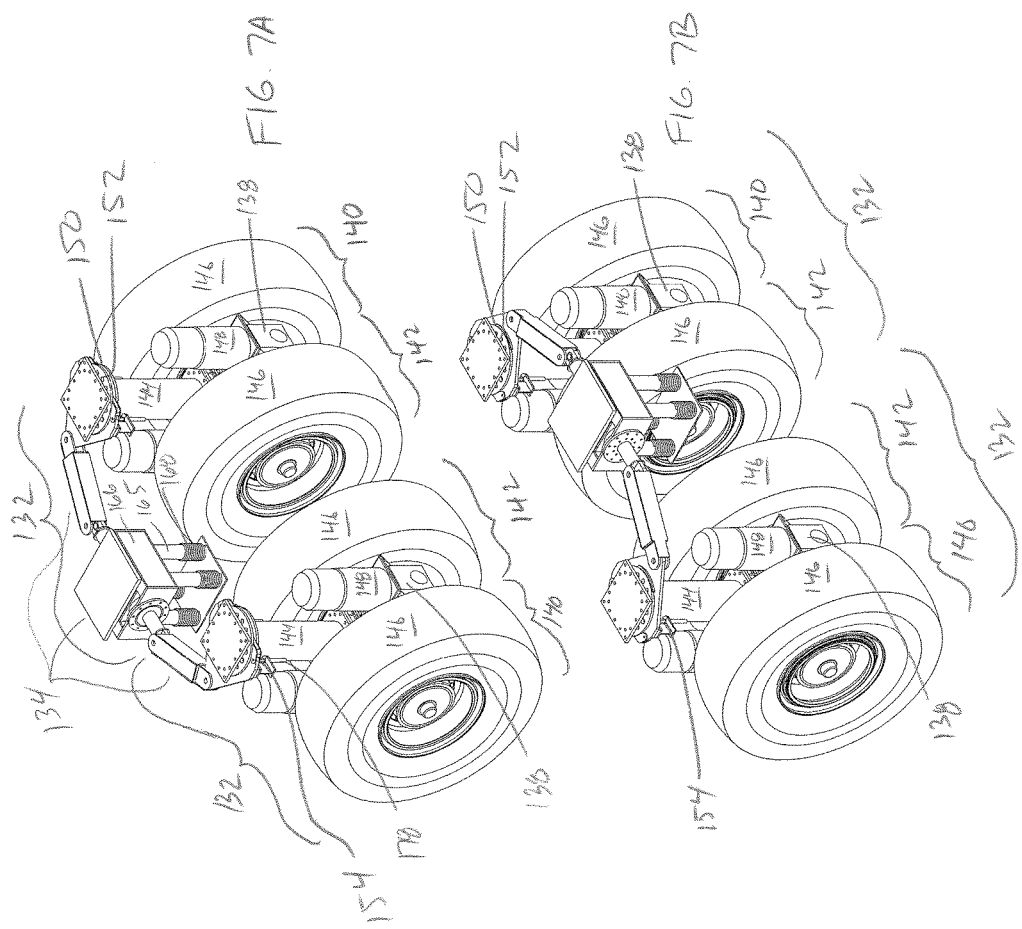

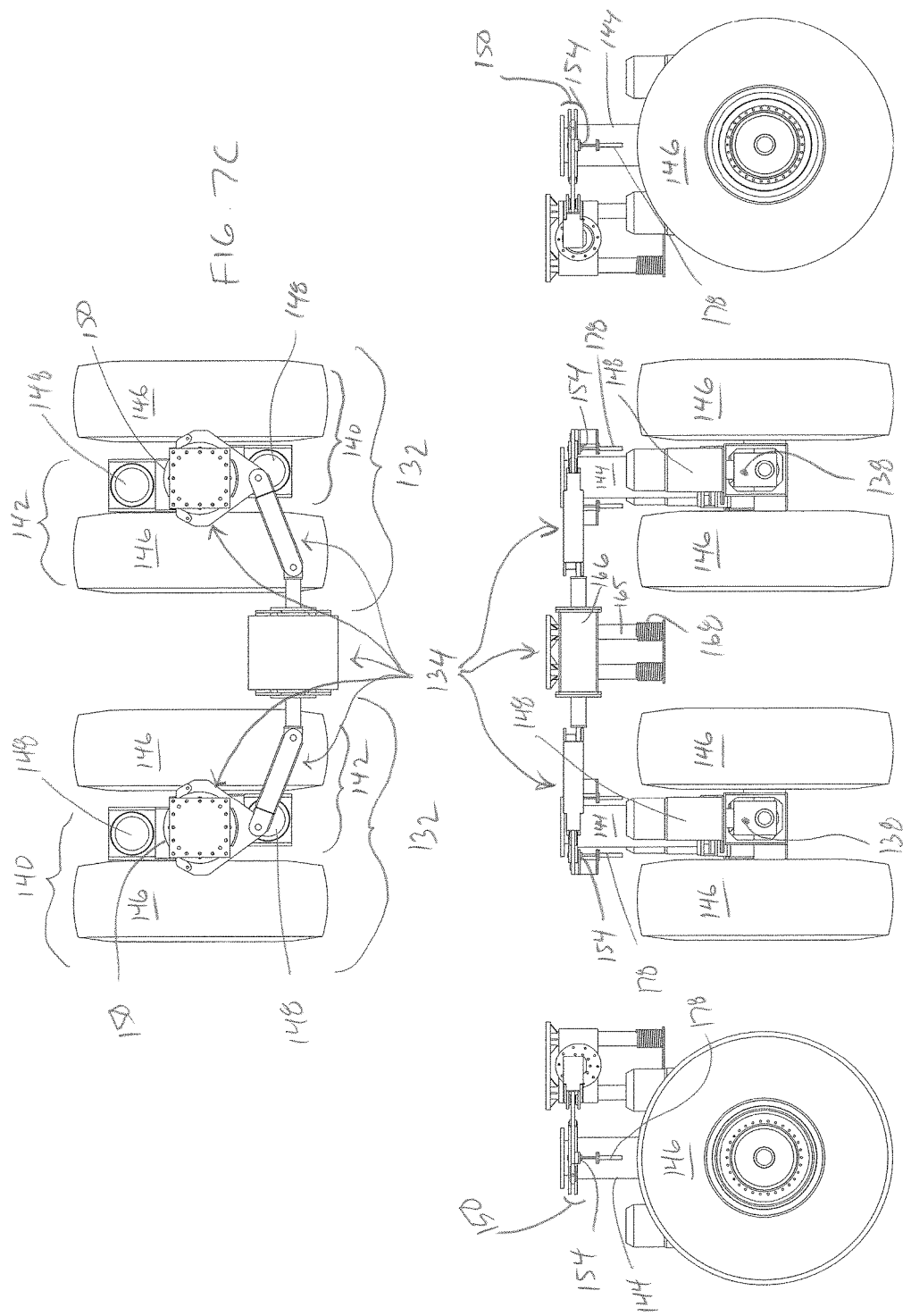

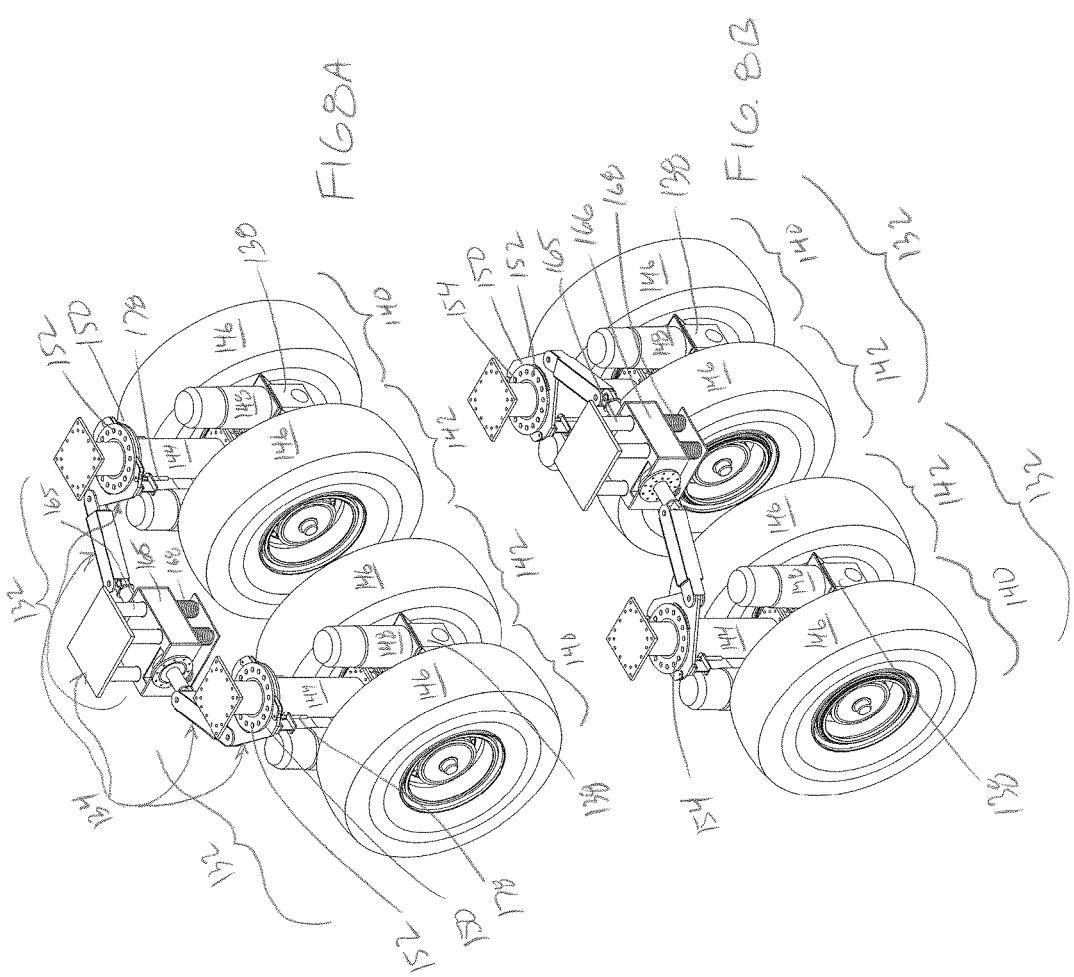

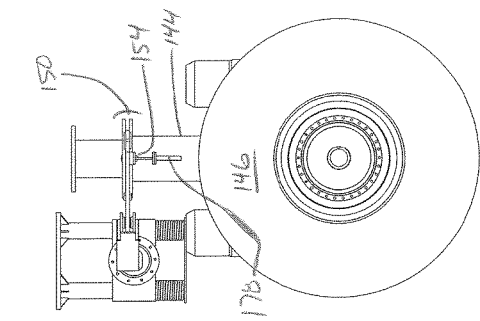
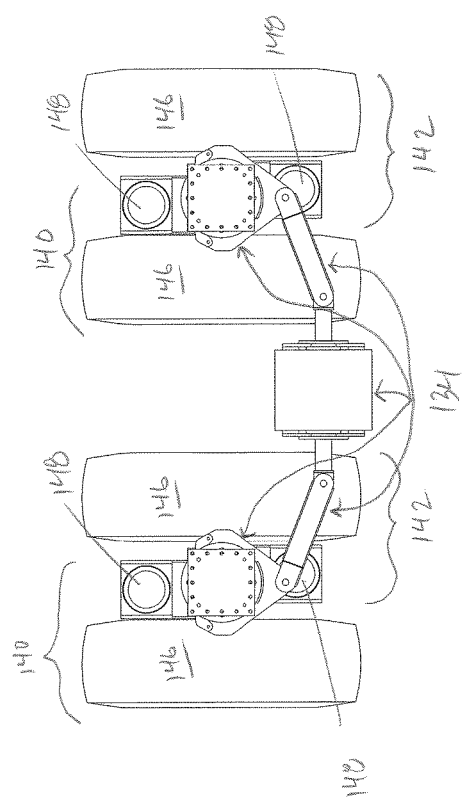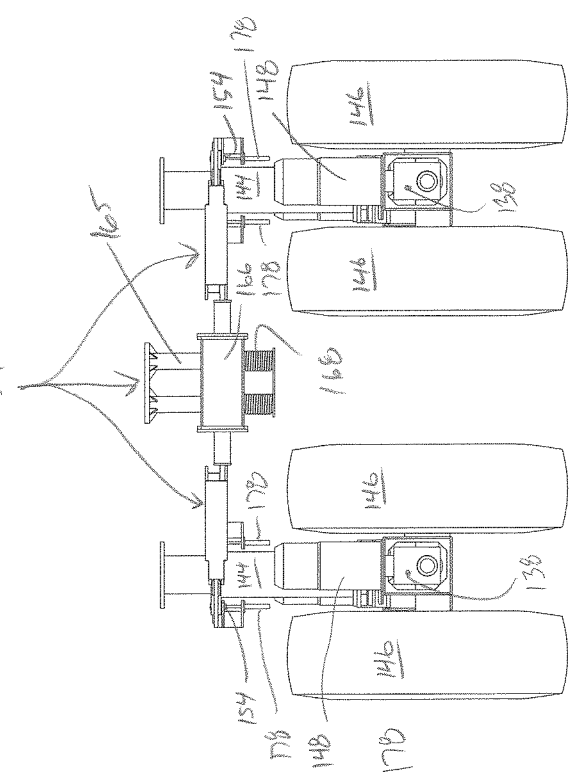
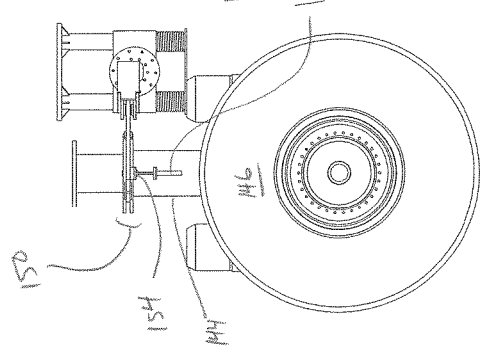

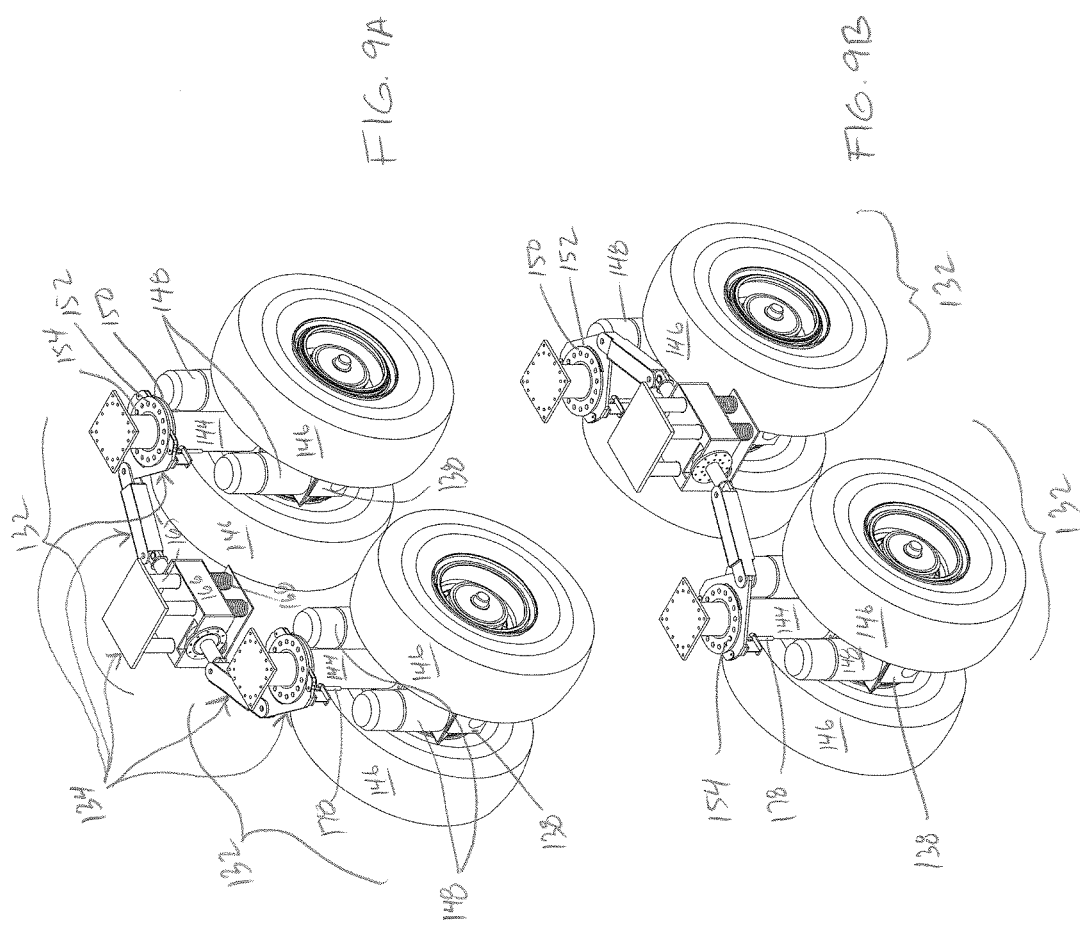

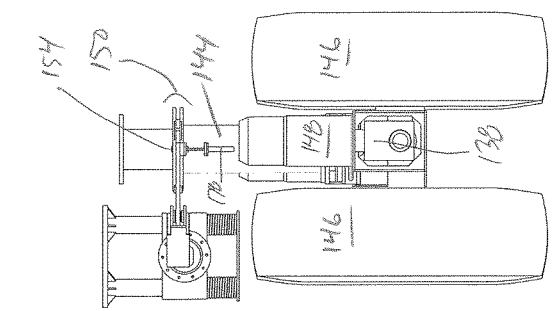
FIG. 9C
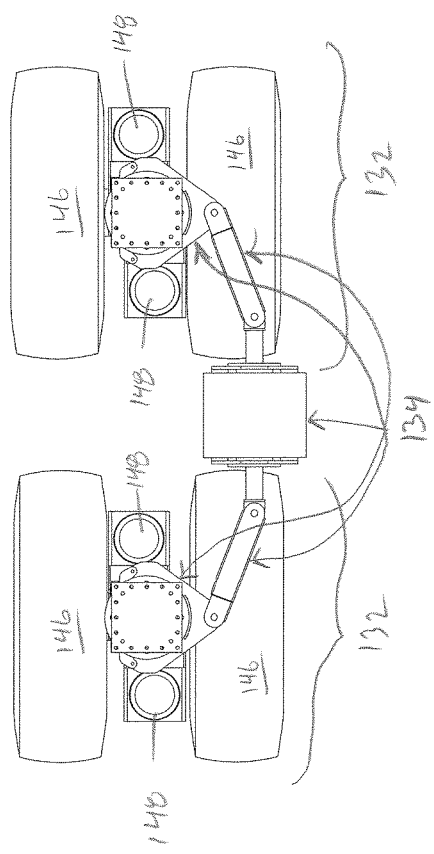
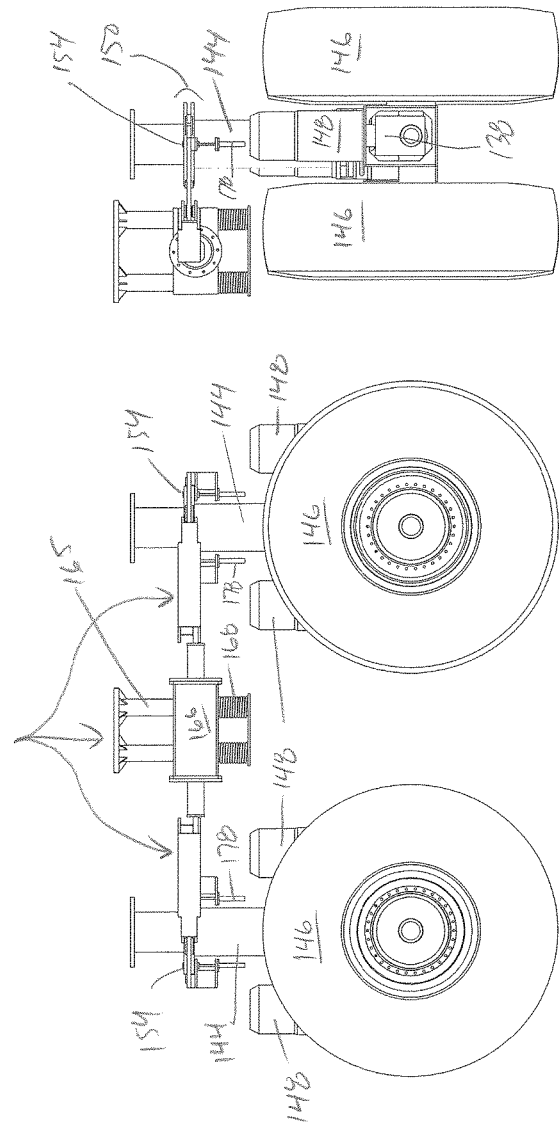
FIG. 9E
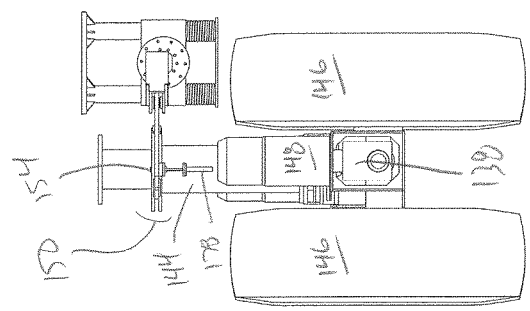
FIG. 9D

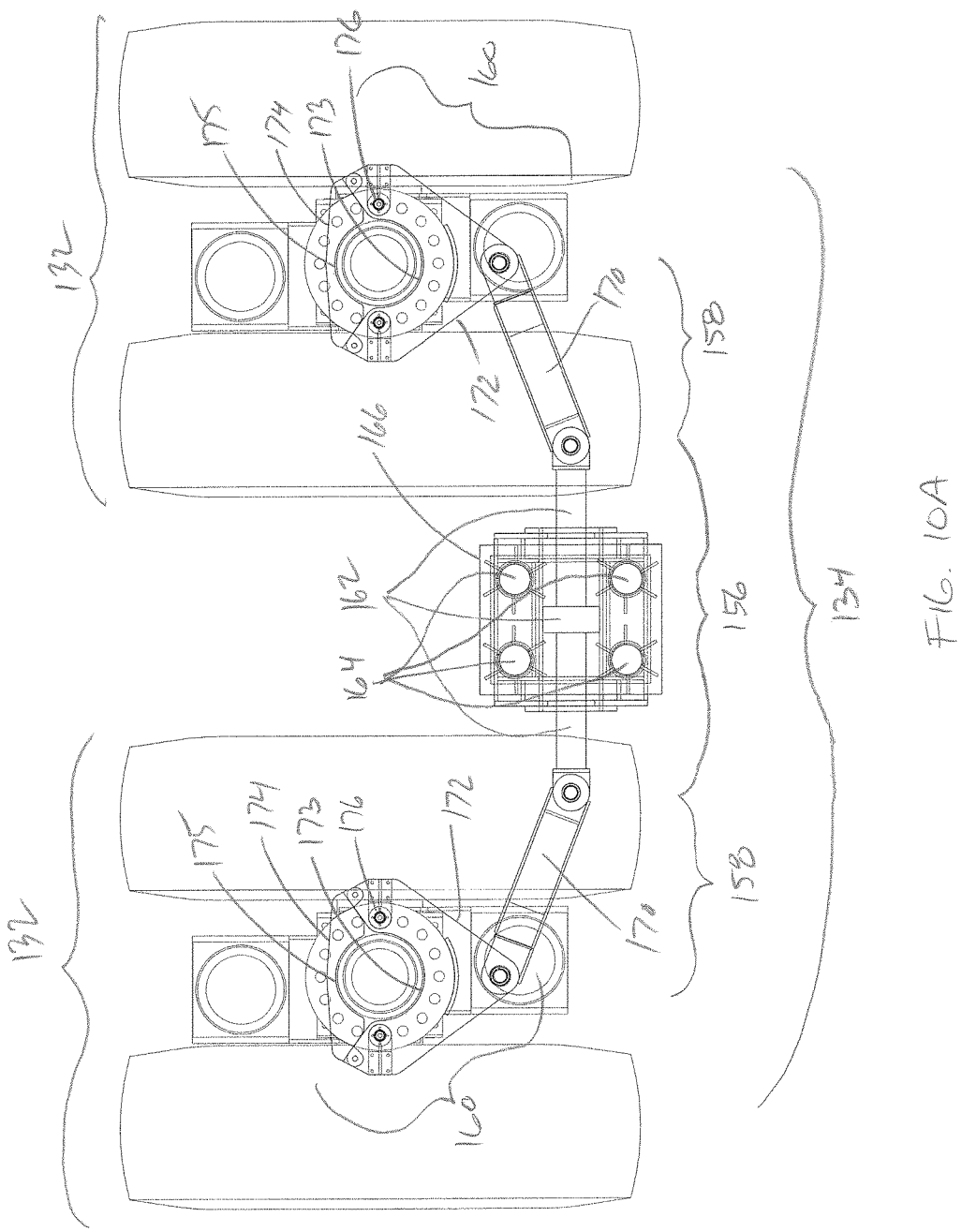

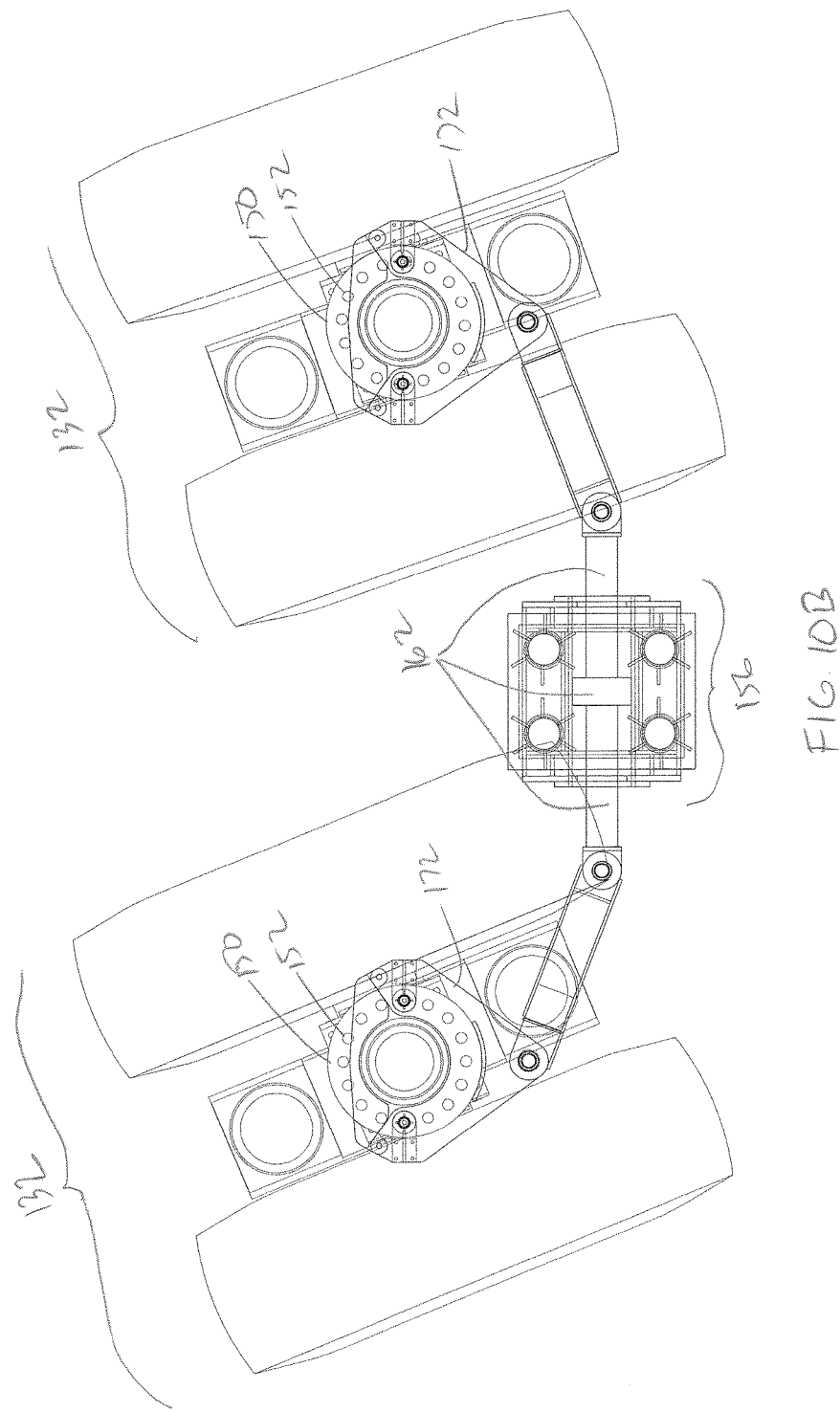

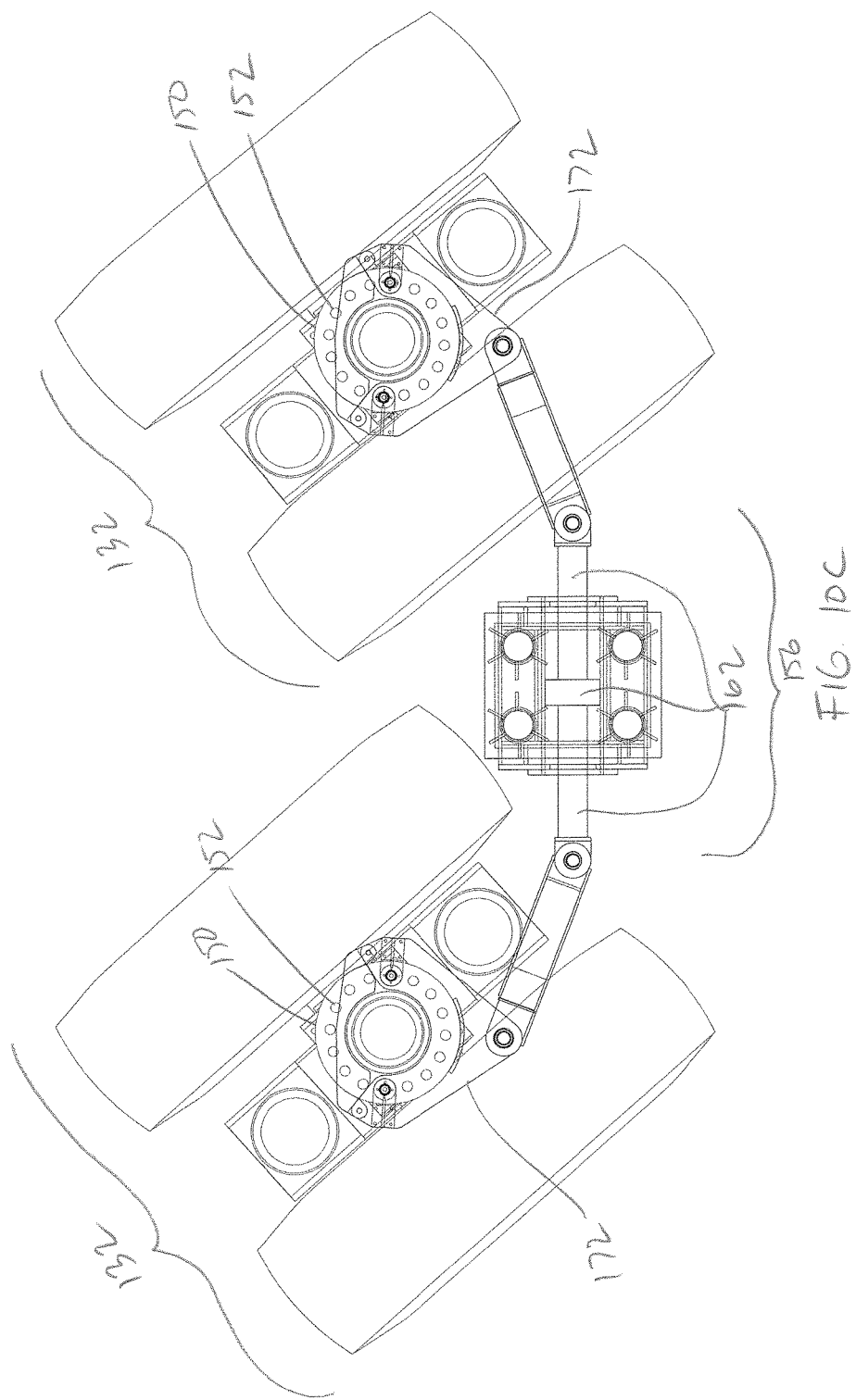

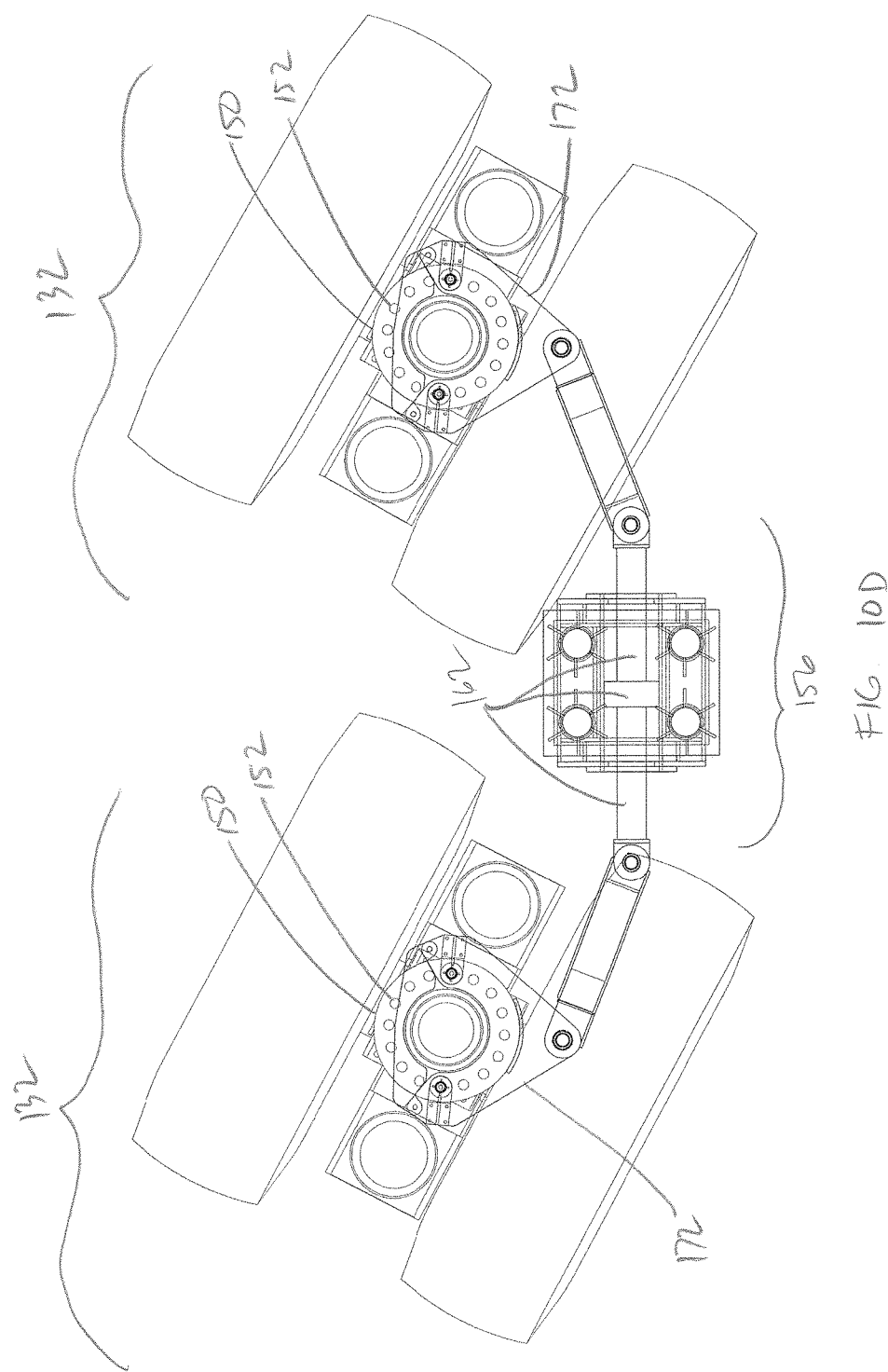

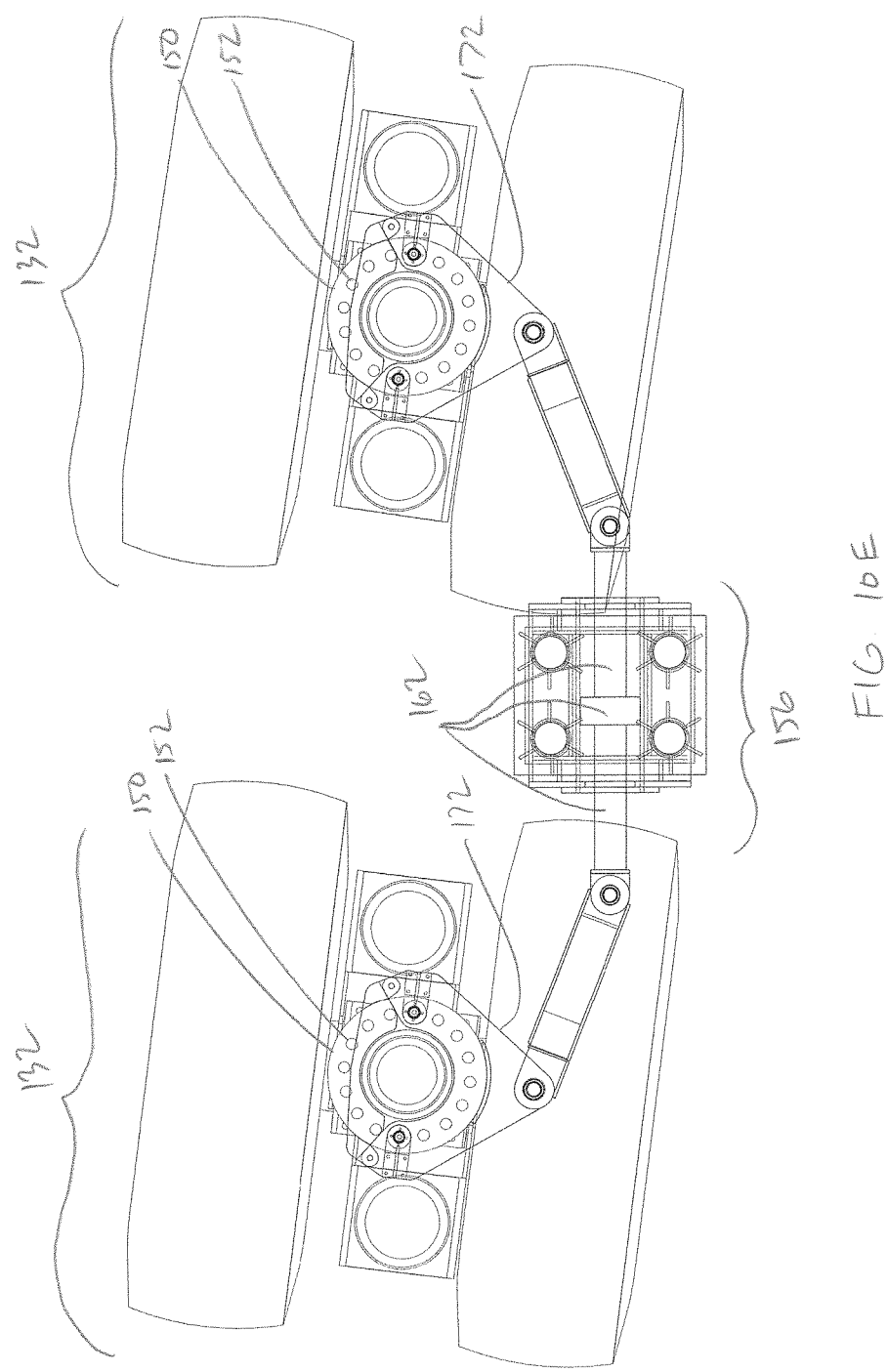

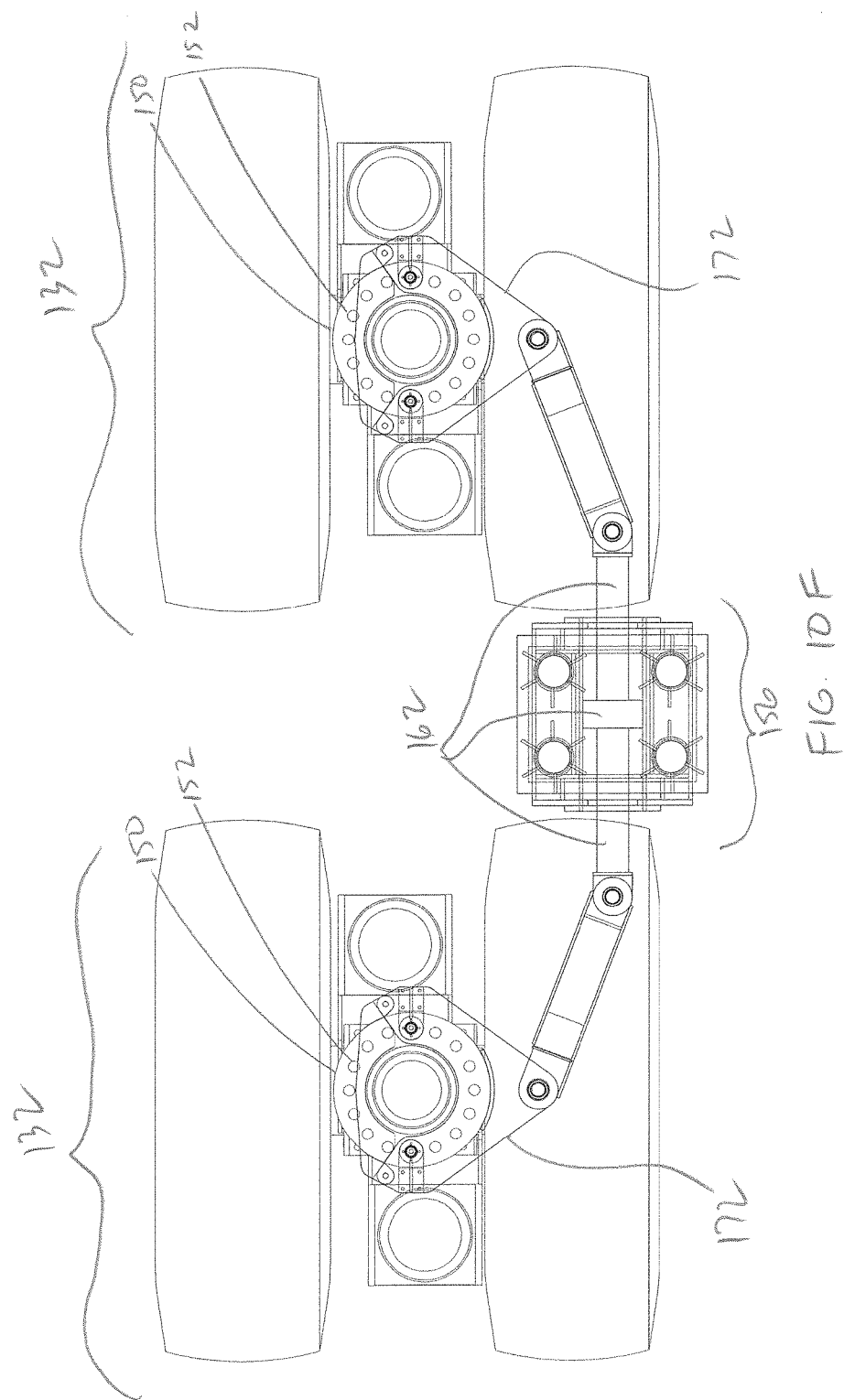

MOVABLE RIG AND STEERING SYSTEM

FIELD OF THE INVENTION

The present application is generally directed to oil rig assemblies. Particularly, the present application relates to movable oil rig assemblies that may include moving systems and may be driven. More particularly, the present application relates to a movable rig having steerable wheel assemblies allowing for driving the rig in any direction.

BACKGROUND

Rigs drilling in the high Arctic may include sealed units to retain heat during drilling operations and rig moves. These rigs may move as a convoy of trailers towed by trucks and self-propelled units as they move between pads in the high Arctic. The typical rig move between pads may be several hundred yards or several miles. The complete rig may also move from well to well on the pad during drilling operations. During rig moves, the loads may be maintained below the tire capacity, bridge capacity, ice road capacity or other limiting factors. In some rigs, each of the 4 corners of the drilling modules may include 2 tires and two hydraulic drives all mounted onto a trunnion style suspension. The rig may include 4 trunnions in total and the rig may include a vertical hydraulic lift cylinder over each of the trunnions.

One style of rig for the Arctic drilling is a cantilevered style. In a cantilevered style rig, the drillfloor, mast, and well center may be cantilevered out over the well and wellhead to provide suitable vertical clearance for drilling operations. The cantilevered nature of the rig may enable the rig to traverse along a row of wells completing each well as it moves parallel to the wells.

These large drilling rigs and modules may be driven utilizing hydraulic motors. Hydraulic moving systems use several hundred gallons of hydraulic oil under pressures of 5000 psi and high flow rates to enable hydraulic motors to power each of the 8 tires. This hydraulic system may provide the tractive effort to move the rig. In an environmentally sensitive area such as the shoreline of the Arctic Ocean, the risk of a large environmental oil spill exists and may be caused by the high pressure and high flow rate of these hydraulic systems. The volume of hydraulic fluid used in these systems to move the rig is substantial and the risk of a hose failure or other substantial leak is great.

The steering mechanisms of these rigs may be known as Akermann steering and it may include a steering bar and hydraulic cylinders. This particular system of driving and steering can lead to tire scrubbing, notably while turning a corner, because the outside tires travel at a different RPM than the inside tires. These differing speeds of the tires at each corner of the drilling module cannot be controlled easily with hydraulics. Additional issues with the Akermann approach is that this steering system cannot rotate each of the 4 wheel sets 90 degrees without removal of the Akermann steering bar which can exceed 15 feet in length and 1000 pounds in weight. User intervention is commonly required and the Akermann steering bar is typically replaced with a different steering bar to provide for 90 degrees of travel. This current style of moving systems cannot enable the drilling module to travel at angles between the longitudinal direction and the transverse direction.

Current drilling modules have Akermann steering in the front and the back of the rig. The current steering geometry does not allow for the wheel sets at the front of the drilling module and the rear of the drilling module to steer together and point to one turn center for proper geometry, while the unit is negotiating a curve while travelling in a longitudinal direction. The turn center only works with current designs with either the front or rear steer acting alone, and pointing to the turn center, for proper geometry. This causes the turning radius of the drilling module vehicle to be larger, and more difficult to maneuver. Without proper steering on a tight curve, as the drilling module traverses the curve, tires may walk off the rims because each tire travels about a different center of rotation. This can be caused by the driver using both front and back steering mechanisms at the same time when each mechanism is not designed for such use. Thus, each tire follows a different radial path rather than a series of concentric radial paths that all converge to the same center point. The tire scrub produced by a lack of steering geometry with all wheel steering, can cause the tires to separate from the rims.

The tires on these rigs may be 40×57 tires and may have a pressure of 120 psi while loaded with over 100 tons per tire. Any excessive flexing of a tire while it is moving, produces heat. Excess heat can cause a tire failure. A tire failure of this size of tire could rupture the moving system hydraulic hoses, and cause an environmental spill on the tundra next to the Arctic Ocean. Moreover, this can result in a dangerous situation where, for example, an explosive tire deflation caused by tire/rim separation occurs and/or stability is reduced. In particular, where the rig includes a very tall vertically extending mast riding on it, the risk of overturning and catastrophic failure may be great. The overall height of the drilling module may exceed 230 feet and placing such a structure at risk of toppling is a grave concern.

SUMMARY

In one or more embodiments, an electric drive, hydraulic steer, moving system may enable a drilling rig with a gross vehicle weight of 1000 tons to be driven on 8 tires, utilizing its own power and in any direct. For example, the vehicle may be drive in any direction ranging from 0 to 90 degrees. The system may be capable of perfect steering while travelling in a longitudinal direction. The rig may also travel under its own power in a transverse direction. The rig may also travel under its own power at any angle between the transverse and longitudinal direction. At any direction past the longitudinal direction, the unit may include the ability for steering correction during this travel.

In one or more embodiments, a rig may include 8 AC electric motors driving 8 right angle gearboxes built into the trunnions, driving 8 planetary gearboxes which are bolted to the rims thus driving the 8 rim and tire assemblies. One drive unit per tire may be provided and each drive unit may be controlled independently. Each of the 4 corners of the drilling module may have 2 of these drives, one per tire, two tires per corner, and 8 tires total. The 8 AC electric motors may be controlled from a Variable Frequency Drive (VFD) house. The controls may be remote and wireless for the driver. The driver may walk alongside the drilling module and control the speed and the steering remotely. There may be 4 trunnions on the system such as one in each corner. The rig may have a vertical hydraulic lift cylinder over each of the trunnions. The AC motors may have electrical cables attached to them such that power may be drawn from drilling rig power such as a generator set inside the drilling module. With the VFD house and the controls for these motors, the unit may be programmed with constant torque in each of the wheels in order to balance the load and speed of each of the wheels as they negotiate a corner. In addition, the electronics may be capable of custom programming such that the speed can be controlled in the moving system to match or approach the safe working speed of the tires in the moving system. This may allow the tires to run safely and avoid overheating from excessive speed. Data may also be collected from this style of moving system. The data may include maximum speed, time travelled, and current load used. The data may be transmitted back to the drilling contractors main office for purposes of analysis and crew monitoring, for example. The moving system may also be governed to a selected speed for tire safety and heat dissipation.

The steering mechanism may include a linkage type of geometry having a double ended cylinder for driving the linkage and the wheel assemblies. This double ended cylinder assembly may be mounted inside a box that is free to travel up and down on 4 guides that have springs, hydraulic cylinders, or other biasing mechanisms on the bottom of the system. Thus, each steering cylinder may be free to travel up and down within its respective wheel assembly as the driller's side and off-drillers side hydraulic cylinders move up or down to lift or lower the load in order to achieve the final ride height of the drilling module. The springs or hydraulic cylinders may prevent the unit from bottoming out on a bottom stopper. The top of the guides may be attached to the body of the drilling module. The amount of hydraulics used to power the moving system may be much smaller than previous systems because less hydraulic fluid at slower speeds may be used to power the steering cylinder, lift cylinder, and the locking or engagement pins as compared to the drive systems of known rigs. The oil for these cylinders may not get as hot as the hydraulic drive moving systems and the cylinders may use a lower oil pressure of 3000 psi to operate and may not require a large volume flow rate.

The front and back steering may be set and/or controlled such that both units may point to one single turn center at the minimum possible turning radius. This is the point where proper steering geometry may be set for the rig, thus reducing tire scrub. Depending on the hole pattern in the steering system, the tire set may turn approximately 22.5 degrees when the drilling module is travelling in a longitudinal direction. All perpendicular radials from each tire may point to the same turn center, thus, resulting in a smooth turn and minimal steer cylinder force needed to make the turn.

For travelling longitudinally along a row of wells, the tires may be rotated 90 degrees on the centerline of each hydraulic lift cylinder using the double ended steering cylinder. For example, and as described in more detail below, the end of the barrel of the lift cylinder has a series of holes for the steering arm link to be capable of locking into any of the desired holes in this setup of holes. Once the maximum stroke is obtained from the steering cylinder, small cylinders connected to locking pins may disengage the pins from these holes at the end of the barrel. Using a guide, the steering arm link can be repositioned using the steering cylinder. Then the small cylinders connected to locking pins may reengage these pins in order to lock steering arm link to a new position. Thus the pair of wheels in each corner may be rotated to any angle so desired, such as 90 for transverse movement or 0 degrees for longitudinal movement, or any angle in between. This acts as a ratchet mechanism, and once the steering is set where the steering bars are symmetrical between the driller's side and off-drillers side, the rig may be moved under its own power. Since the steering mechanism is reset to symmetrical before travel, there exists the possibility of small steering adjustments with the steering mechanism, +/−1 to 2 degrees, in order to correct the location of the drilling module as it moves. This slight steering adjustment angle features locked stoppers, because the limit of steer may be 1 to 2 degrees. This degree of adjustment is small enough to avoid tire scrub, due to the very large turning radius in play and the short travel distance involved on a row of wells on a pad. In addition, since the steering arm is adjustable in any radial direction on the barrel of the lift cylinder, a right hand and left hand lift cylinder is not required for steering.

The moving system may perform opposite steering between front and back moving systems, such as when navigating a corner. That is, the front wheels may be turned toward the right and the rear wheels may be turned toward the left to allow the vehicle to navigate a right turn. This may occur on long road moves, for example. However, the system may also be capable of all 8 tires being pointed in the same direction in an angle between 0 degrees longitudinal and 90 degrees transverse, such as 45 degrees but not limited to this angle. Thus the entire drilling module may crab over at this angle while maintaining its longitudinal and transverse position as it travels. Since the steering mechanism is reset to symmetrical before travel, there exists the possibility of small steering adjustments with the steering mechanism, +/−1 to 2 degrees, in order to correct the location of the drilling module as it moves. This slight steering adjustment angle features locked stoppers, because the limit of steer would be 1 to 2 degrees. This is small enough to avoid undue tire scrub due to the very large turning radius in play. This may occur over short travel distances such as on a row of wells, for example.

Movement between wells may be done at the 90 degree position. This may save the rig from driving off of the well patterns and then backing up again. The wheelbase of the drilling module may be long and even with proper steering geometry at 22.5 degrees the maneuverability of this unit may be limited. With the wheels turned 90 degrees the drilling module is free to move sideways. The moving system does not have any pieces of equipment that need removal before turning the wheels 90 degrees, such as the removal of the Akermann steering bar, or the reinstallation of a different steering bar once the wheels are at 90 degrees. The entire process of repositioning the wheels under the drilling module can be done remotely by the operator in a safe environment with no overhead lifting of any of the components, and no one getting in between the tires.

The moving system at each end of the rig may also include vertical play of up to 6" on each side in order accommodate any lack of levelness between the driller side and off-drillers side lift cylinders. The 4 lift cylinders may all be symmetrical with the adjustable steering arm pinning system, thus ensuring interchangeability with each other for spare parts or cylinder swapping.

In some embodiments, the moving system described herein for moving a rig may be used to move a support complex such as a mud system, pipeshed, or other system or device. The system may also be scalable for small rigs rather than large rigs. In still other embodiments, the moving system may be useable for desert rigs or large loads in the Middle East rather than Arctic applications.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

FIG. 1 is a perspective view of a drill rig and supporting systems, according to one or more embodiments.

FIG. 2 is a close-up view of the rig of FIG. 1 in isolation from the supporting systems, according to one or more embodiments.

FIG. 3 is a side view of the rig of FIGS. 1 and 2, according to one or more embodiments.

FIG. 4 is a perspective view of a wheelhouse portion of the rig of FIG. 1, according to one or more embodiments.

FIG. 5 is a perspective bottom view of the wheelhouse portion of FIG. 4, according to one or more embodiments.

FIG. 6 is a perspective bottom view of a pair of wheel assemblies of the wheelhouse of FIG. 4, according to one or more embodiments.

FIG. 7A is a perspective rear/left view of a pair of wheel assemblies in a drilling or retracted position, according to one or more embodiments.

FIG. 7B is a perspective front/left view of the pair of wheel assemblies of FIG. 7A, according to one or more embodiments.

FIG. 7C is a top view of the pair of wheel assemblies of FIG. 7A, according to one or more embodiments.

FIG. 7D is a right side view of the pair of wheel assemblies of FIG. 7A, according to one or more embodiments.

FIG. 7E is a front side view of the pair of wheel assemblies of FIG. 7A, according to one or more embodiments.

FIG. 7F is a left side view of the pair of wheel assemblies of FIG. 7A, according to one or more embodiments.

FIG. 8A is a perspective rear/left view of a pair of wheel assemblies in a driving or deployed position, according to one or more embodiments.

FIG. 8B is a perspective front/left view of the pair of wheel assemblies of FIG. 8A, according to one or more embodiments.

FIG. 8C is a top view of the pair of wheel assemblies of FIG. 8A, according to one or more embodiments.

FIG. 8D is a right side view of the pair of wheel assemblies of FIG. 8A, according to one or more embodiments.

FIG. 8E is a front side view of the pair of wheel assemblies of FIG. 8A, according to one or more embodiments.

FIG. 8F is a left side view of the pair of wheel assemblies of FIG. 8A, according to one or more embodiments.

FIG. 9A is a perspective rear/left view of a pair of wheel assemblies in a driving or deployed position and turned 90 degrees, according to one or more embodiments.

FIG. 9B is a perspective front/left view of the pair of wheel assemblies of FIG. 9A, according to one or more embodiments.

FIG. 9C is a top view of the pair of wheel assemblies of FIG. 9A, according to one or more embodiments.

FIG. 9D is a right side view of the pair of wheel assemblies of FIG. 9A, according to one or more embodiments.

FIG. 9E is a front side view of the pair of wheel assemblies of FIG. 9A, according to one or more embodiments.

FIG. 9F is a left side view of the pair of wheel assemblies of FIG. 9A, according to one or more embodiments.

FIG. 10A is a top view of a pair of wheel assemblies, according to one or more embodiments.

FIG. 10B is a top view of the pair of wheel assemblies of FIG. 10A where the wheels are turned 22.5 degrees relative to the position of FIG. 10A, according to one or more embodiments.

FIG. 10C is a top view of the pair of wheel assemblies of FIG. 10A where the wheels are turned 22.5 degrees relative to the position of FIG. 10B, according to one or more embodiments.

FIG. 10D is a top view of the pair of wheel assemblies of FIG. 10A where the wheels are turned 22.5 degrees relative to the position of FIG. 10C, according to one or more embodiments.

FIG. 10E is a top view of the pair of wheel assemblies of FIG. 10A where the wheels are in the process of turning the remaining degrees for a 90 degree turn relative to the position of FIG. 10A, according to one or more embodiments.

FIG. 10F is a top view of the pair of wheel assemblies of FIG. 10A where the wheels are turned 22.5 degrees relative to the position of FIG. 10D and 90 degrees relative to the position of FIG. 10A, according to one or more embodiments.

DETAILED DESCRIPTION

Figure 11:
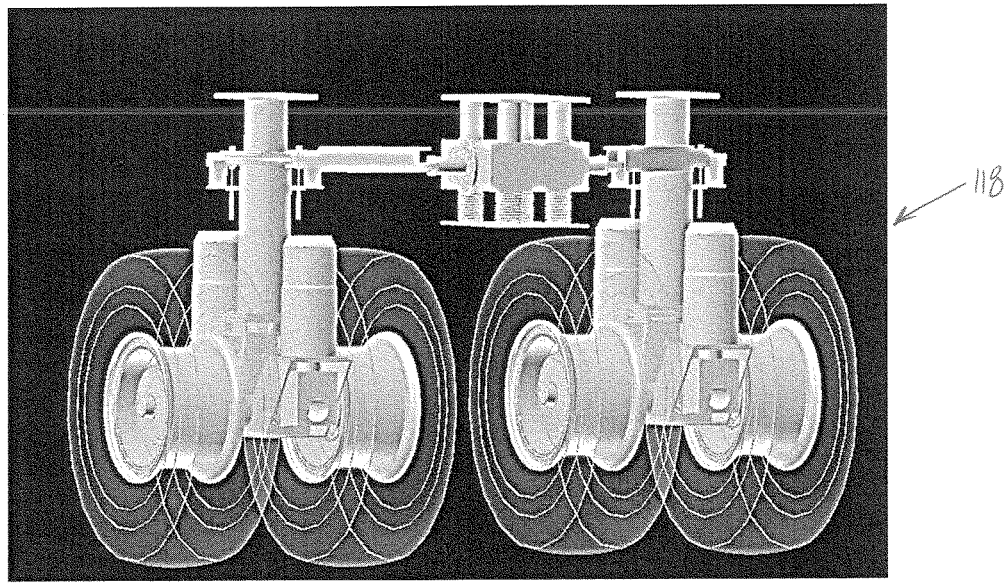
FIG. 11 is a perspective view of a pair of wheel assemblies according to one or more embodiments.

The present application, in one or more embodiments, relates to a moving system for a drill rig. In particular, the moving system may be an electrically driven system having a steering mechanism providing for a high level of directional range of motion allowing for travel at 90 degrees relative to a primary direction, for example. The moving system may be operated completely automatically without the need for physical intervention or adjustment by operators making the system easier to use and safer to operate. The steering mechanism may be configured to accommodate various radii turns and may allow for coordinated steering between the front and rear mechanisms thereby avoiding tire scrub and further avoiding having tires walk off of rims or other dangerous conditions. The electrically driven system may provide an alternative to high pressure, high flow, hydraulic drive systems and thereby may reduce the risks of environmental effects associated with hydraulic failures and, in particular, hydraulic fluid leaks. The flexibility of the present drive system allows for a high level of rig moving versatility and positioning advantage.

With reference to FIG. 1, a drill rig assembly 100 is shown. The drill rig assembly 100 may include a drill rig portion 102 and various assemblies and systems 104 for supporting drilling operations. In particular, the assemblies and systems 104 may include a pipeshed, a mud tank module, a mud pump module, a power module, and a cutting module. Still other facilities and systems may be provided. In some embodiments, the drill rig 102 and supporting assemblies and systems 104 may be configured for arctic operations and, as such, may be partially or fully enclosed. In FIG. 1, the drill floor 106 and mast 108 of the drill rig 102 is shown in a cantilevered condition. That is, the drill rig 102 may include a cantilevering rail system 110 allowing the drill floor 106 and mast 108 to shift laterally relative to a supporting structure of the rig 102 such that drilling operations may be performed in an offset position relative to the supporting structure.

FIG. 2 shows the drill rig in isolation from the other supporting assemblies and systems. In FIG. 2, the rig 102 has been shifted back from its cantilevered condition and is being viewed from the rear of FIG. 1, for example. Of particular note with respect to the present application is the presence of a wheelhouse 112 on each of the front or cab end 114 and rear or well end 116 of the rig 102. Each wheelhouse 112 may be configured to enclose a moving system 118. In particular, the wheelhouse 112 may function to support the rig 102 during drilling operations and may provide for deployment of a moving system 118 allowing the rig 102 to be picked up and supported by the moving system 118 for purposes of transport between drilling locations. A side view of the drill rig 102 is shown in FIG. 3 where it can be seen that a front cab 120 or drive location may be provided extending from the front 114 of the rig. It is to be appreciated that while an operator may drive the rig 102 from the front cab 120, the automated nature of the system may also allow the operator to drive the rig 102 from outside the rig 102 such as, for example, while walking with the rig 102 and monitoring the position of the rig 102 relative to the travel path or roadway or monitoring the rig 102 relative to a drilling location or well center. In this embodiment, the operator may use a tablet or other mobile computing device such as an ipad or other computing device having a moving system interface.

FIG. 4 shows a wheelhouse 112 in isolation from the rig 102. The wheelhouse 112 may be configured to support the rig 102 and enclose the moving system 118, while allowing for deployment of the moving system 118 to move the rig 102. The wheelhouse 112 may include a rig interface 122, a cage or truss walls portion 124, and a foot or bearing pad portion 126. As shown, the moving system 1118 may be arranged within the truss walls 124 and may have a deployed position where a bottom of the moving system 118 is below the bearing pad 126 and a retracted position where a bottom of the moving system 118 is at or above the bearing pad 126. As such, when the moving system 118 is deployed, the rig 102 may be fully supported by the moving system 118 and the bearing pad 126 may be raised off of the ground. When the moving system 118 is retracted, the bearing pad 126 may be in contact with the ground to support the rig 102 during drilling operations.

As discussed, the bearing pad 126 of the wheelhouse 112 may be configured to support the rig 102 during drilling operations. The bearing pad 126 may extend around all or a portion of the wheelhouse 112. In some embodiments, the bearing pad 126 may extend along each of two sides of the wheelhouse 112 or it may extend along each of four sides. The bearing pad 126 may be attached to a bottom of the truss walls 124 and may be configured to receive rig loads from the truss walls 124 and transfer rig loads to the ground. The bearing pad 126 may include a relatively flat ground-contacting surface configured for distributing loads to the surface of the ground. The bearing pad 126 may be relatively plate like and may have a tapered shape where the pad is thinner near its outer edges and thicker near its inner portion so as to accommodate shear and bending forces resulting from rig loads. In some embodiments, the tapered shape may be provided in the form of stiffeners arranged on a relatively flat constant thickness plate rather than varying the thickness of the plate. In some embodiments, a combination of both may be provided. The bearing pad 126 may be pivotally connected to the truss walls 124 to accommodate unevenness in the ground or the bearing pad 126 may be more rigidly connected as shown.

The truss walls 124 may extend upwardly from the bearing pad 126 to form a surrounding structure to house the moving system 118. The truss walls 124 may include a plurality of upright support elements and a series of diagonal and/or cross braces. In some embodiments, the series of diagonal and/or cross braces may be removable so as to allow access to the moving system 118 and allow for maintenance and/or repair. For example, one or more diagonal and/or cross braces may be removed to allow for tire changing or repair.

With reference to FIGS. 5 and 6, the rig interface 122 of the wheelhouse 118 may include a relatively flat roof-like structure supported by the truss walls 124 and extending across the top of the moving system 118. The rig interface 122 may be structurally designed to receive rig loads and transfer them to the supporting structure. In some conditions of use, the supporting structure may include the truss walls 124 of the wheelhouse 112 when the moving system 118, for example, is not deployed. In other conditions of use, the supporting structure may include the moving system 118 when, for example, the moving system 118 is deployed. The rig interface 122 may include a series of cross members extending across the wheelhouse 112 and above the moving system 118 from one side of the truss walls 124 to an opposing side, for example. The rig interface 122 may include one or more cover plates or surfaces above and/or below the cross members. In one or more embodiments, the rig interface may include a deployment point or points 128 and a steering control point 130. The deployment point or points 128 may include locations where jacking cylinders may engage the rig interface 122 to deploy the moving system. In one or more embodiments the cross members may be arranged to extend across the wheelhouse 112 so as to pass above the deployment point 128 and, as such, allow for connection of the jacking cylinder to the cross member. In some embodiments, the cross members may drop near the deployment point 128 so as to increase the strength of the cross members and accommodate the high loads imparted when the moving system 118 is deployed. The steering control point 130 may include a location of attachment for a steering mechanism and may provide a reference point for lateral shifting and/or movement used in steering the moving system 118.

As mentioned, the moving system 118 may be housed within the above-described wheelhouse 112. The moving system 118 may be configured for deployment from the wheelhouse 112 and retraction within the wheelhouse 112. The moving system 118 may also be configured to move the rig 102 in a selected direction and may further allow for steering the rig 102 while moving and/or otherwise adjusting the direction of travel of the rig 102 before beginning travel in that particular direction. The moving system 118 may include a pair of same or similar wheel assemblies 132 arranged substantially adjacent to one another within the wheelhouse 112. In some embodiments, more or fewer wheel assemblies 132 may be provided. The moving system 118 may also include a steering system 134 for steering the wheel assemblies 132 relative to the rig 102 and allowing the direction of travel to be controlled.

The wheel assemblies 132 may be configured for rolling engagement with the ground to allow the rig 102 to move and may also be configured for rotation about a substantially vertical axis 136 to accommodate steering of the rig 102. In one or more embodiments, the wheel assemblies 132 may each include a central core element 138, an outer wheel system 140 arranged to an outer side of the central core element 138 and an inner wheel system 142 arranged to an inner side of the central core element 138. The wheel assemblies 132 may also each include a jacking element 144 arranged between outer and inner wheel systems and between the core element 138 and the rig interface 122.

With reference now to FIGS. sets 7A-7F, 8A-8F, and 9A-9F, each of the outer wheel system 140 and inner wheel system 142 may each include a wheel 146 offset from the central core portion 138 and an electric drive motor 148 arranged on the central core portion 138. The wheels 146 may be arranged adjacent to the central core portion 138 to form a pair of wheels. The electric drive motors 148 may be configured to impart rotational force to their respective wheels 146 to drive the rig 102. The electric drive motors 148 may be arranged vertically between the inner and outer wheels of each wheel assembly 132 and may include a vertically extending drive shaft. The drive shaft may extend downwardly into the central core 138 portion. The central core portion 138 may include a right angle gear box. The gear box may be connected to a planetary gear system that may be provided to drive a respective wheel arranged in a substantially vertical plane. The wheels 146 may be supported relative to the central core portion 138 by the planetary system, which may be bolted to a substantially horizontally extending trunnion axle supported off of the central core 138 portion by a pin. The trunnion axle may allow the pair of wheels 146 to function together and accommodate uneven surfaces where the trunnion axle may be able to rotate about a longitudinal substantially horizontal axis defined by its supporting pin.

A jacking or deployment system 144 may be arranged on the central core portion 138 between the inner and outer wheel and may extend upwardly from the central core portion 138 to engage the rig interface portion 122 of the wheelhouse 112. The jacking or deployment system 144 may be configured to extend a respective wheel assembly 132 away from the rig interface 122 beyond the foot 126 of the wheelhouse 112 thereby deploying the wheel assembly 132 for use. The jacking or deployment system 144 may include a hydraulic cylinder system. The hydraulic cylinder may be arranged such that the base or cap of the cylinder is secured to the central core portion 138 and rod portion extends upwardly therefrom to the rig interface 122. The rod portion may include a flange plate and may be secured to rig interface 122 at a deployment point 128. As the cylinder is actuated, the rod portion may extend out of the barrel thereby elongating the cylinder and driving the central core portion 138 away from the rig interface 122.

The jacking or deployment system 144 may be a non-keyed cylinder such that the rod is free to rotate relative to the barrel, for example. As will be explained in more detail below, the steering system 134 may engage the barrel portion of the jacking or deployment system 144 so as to rotate the barrel relative to the rod and, thus, rotate the wheel assemblies 132. As part of the engagement of the steering system 134, the cylinder head of the jacking system 144 may include a plate or a series 150 of plates to be engaged by the steering system 134.

In one or more embodiments, the plate or series of plates 150 may include a sandwich plate including a pair of plates spaced apart from one another and configured to receive a portion of the steering mechanism therebetween. The pair of plates 150 may be generally or substantially annular in shape allowing the rod and/or the barrel of the jacking cylinder 144 to pass therethrough. The pair of plates 150 may be rigidly secured to the barrel of the jacking cylinder 144 such that rotational forces applied to the pair of plates 150 may impart rotational motion on the wheel assembly 132 relative to the jacking rod 144 and the rig 102. In some embodiments, the pair of plates 150 may be directly secured to the barrel of the jacking cylinder 144. In other embodiments, the separation of the pair of plates 150 may be created by a bushing or collar arranged on and secured to the barrel of the cylinder and the plates 150 may be secured thereto. In either case, the cylindrical element extending between the pair of plates 150 may define a neck having a substantially circular shape and having an outer diameter. In some embodiments, the plates 150 may be arrange one above the other and the space between the plates may be sufficient to receive a jaw plate of the steering system as described in more detail below.

The pair of plates 150 may include a series of holes or apertures 152 for receiving an engagement pin 154. The plates 150 may be arranged in spaced apart position and the holes 152 in one plate may be aligned with holes 152 in the other plate 150. The holes 152 in the pair of plates 150 may be arranged to accommodate particular angular motions or rotations of the wheel assembly 132. In some embodiments, the holes 152 may be arranged in an annular array or row along a circular centerline of the annular plate. In some embodiments, the holes 152 may be in multiple rows and may be staggered from one row to another row. Still other arrangements of holes 152 may be provided. In some embodiments the holes 152 in a particular row may be spaced from one another such that adjacent holes are approximately 10 degrees, 22.5 degrees, 30 degrees, 45 degrees, 90 degrees, or other angles apart from one another. Still other angular spacings may be provided.

In some embodiments, the wheels may be sized to accommodate a 1000 ton rig. Where eight wheels are provided, each wheel may be configured to support 250,000 pounds. In some embodiments, the tires may be 40×57, for example, and may include a tire pressure of approximately 120 psi. Other tires sizes may be used.

Having discussed the wheel assemblies 132 in great detail, it is noted that adjacent wheel assemblies 132 may be spaced from one another sufficiently to allow for full rotation or at least 90 degrees of rotation. The wheel assemblies 132 may, thus, be spaced from one another a distance equal to one wheel diameter and, in some embodiments, 1¼ or 1½ wheel diameters. The wheelhouse 112 may be sized accordingly, and may also provide sufficient clearance around the wheel assemblies 132 to allow for full rotation or at least 90 degrees of rotation of the wheel assemblies 132.

With reference to FIGS. 10A-10F, the moving system 118 may include a steering system 134 configured for controlling the planetary orientation of the wheel assemblies 132 and, as such, the travel direction of rig. The steering system 134 may include a control device 156, a linkage assembly 158, and a wheel assembly engaging portion 160. The steering system 134 may be connected to the rig interface 122 portion of the wheelhouse 112 and, as such, may forcibly impart rotational motion of the wheel assemblies 132 relative to the rig 102.

The control device 156 may be configured for actuating motion of the wheel assemblies 132 and may be further configured to do so in the deployed and/or retracted position. The control 156 device may, thus, include an actuating portion 162 for actuating steering motions and a guide system 164 allowing the control device 156 to track and/or follow the deployment and retraction of the wheel assemblies 132. The control device 156 may be positioned between the one or more wheel assemblies 132 and may be configured to simultaneously control the orientation of the wheel assemblies 132 such that a change in orientation of one wheel assembly 132 is correspondingly changed in the other wheel assembly 132.

The guide system 164 of the control device 156 may include one or a series of guides such as guide rods 165 secured to the steering control point 130 and extending downwardly from the steering control point 130. The guide system 164 may include a housing 166 arranged on the guide rods 165 and configured for sleevably travelling up and down along the length of the guide rods 165. The guide rods 165 may include one or more biasing elements 168 arranged thereon and configured for biasing the housing 166 in an upward position. In some embodiments, the biasing elements 168 may include springs concentrically arranged on the guide rods 165 and biased between a guide rod flange and the housing 166. In other embodiments, the biasing elements 168 may be hydraulic cylinders that may be actuated to control the position of the control device. In other embodiments, the control device may be free floating using counter-weights and pulleys, instead of cylinders or springs. In this embodiment, it may function as a weightless component within the suspension, as the suspension system moves over uneven terrain. In the case of biasing elements, such as springs, the biasing elements 168 may be relatively stiff, but may have a stiffness that is overcome when the wheel assemblies are moved to a deployed position. The length of the guide assemblies may be such that the control system 156 may move a distance away from the rig interface 122 that is substantially the same as the deployment distance of the wheel assemblies 132. That is, a stroke length of the housing 166 along the guide system 164 may be the same or similar to the stroke length of the jacking or deployment cylinder 144 of the wheel assembly 132 such that the control system 156 may move together with the deployment of the wheel assemblies 132.

The actuating portion 162 of the control device 156 may include a laterally moving mechanism that may push on one wheel assembly 132 while pulling on another wheel assembly 132. The actuating portion 162 may be offset rearward or forward from a laterally extending centerline of the wheel assemblies 132 and by pushing/pulling on the wheel assemblies (i.e., from side to side in FIG. 10A), the actuating portion 162 may create a torsional or torque force on the wheel assemblies 132 causing them to rotate. By virtue of being positioned between the assemblies 132, the push/pull of the actuating portion 162 may cause each wheel assembly to rotate in the same direction. (i.e., clockwise or counter clockwise in FIG. 10A).

The actuating portion 162 may include a double-ended cylinder. The double-ended cylinder may include a barrel having a rod extending from each end where extension of a rod out one side of the barrel may simultaneously cause retraction of a rod into the other side of the barrel. In some embodiments, the actuating portion may include a rack and pinion driven by an electric or hydraulic motor, for example. In the case of the double-ended cylinder, the amount of extension of the rod out of or into the barrel may provide for a partial rotation of a wheel assembly 132. For example, the extension of the rod out of or into the barrel may create rotation of a wheel assembly 132 less than the full available rotation of the wheel assembly 132. Further rotation of the wheel assembly may be provided for by disengaging the actuation portion 162 from the wheel assembly 132, retracting the rod (or extending the rod as the case may be), reengaging the actuation portion 162 with the wheel assembly 132 and further rotating the wheel assembly 132. Accordingly, the stroke of the cylinder may be less than that which may be used to induce a larger rotation, for example.

A linkage assembly 158 may extend from each end of the actuating portion 162 and may be configured to transfer the lateral force and motion from the actuating portion 162 to the wheel assembly engaging portion 160 while accommodating the rotation of the engaging portion 160. The linkage assembly 128 may include a laterally extending bar 170 having a first jaw connection at the rod of the actuating portion 162 and a second jaw connection at the wheel assembly engaging portion 160. In some embodiments, the bar 170 may be a solid bar or a hollow bar, such as a pipe or tube. The bar 170 may be pivotally connected to the rod with a pin or other pivotal connection and may similarly be connected to the wheel assembly engaging portion with a pin or other pivotal connection.

The wheel assembly engaging portion 160 may engage the wheel assembly 132 and transfer forces from the actuation portion 162 to induce rotational motion of the wheel assembly 132. The engaging portion 160 may be configured for selectively engaging the wheel assembly allowing for a ratcheting, stepping, or incremental approach to rotating the wheel assembly 132. The engaging portion 160 may include a jaw plate 172 configured for selective engagement with the jacking or deployment cylinder 144. In particular, the jaw plate 172 may be configured for engagement with the jacking or deployment cylinder 144 at or near the cylinder head of the barrel of the jacking cylinder 144. As such, the engaging portion 160 may be configured to cause the barrel portion of the jacking cylinder 144 to rotate relative to the rod portion thereof thereby causing the wheel assembly 132 to rotate.

The jaw plate 172 may extend from the linkage assembly 158 and may be configured to engage the sandwich plates 150 arranged at or near the cylinder head of the jacking cylinder 144. The jaw plate 172 may be substantially planar so as to slidably engage the pair of plates 150 and allow for relative rotation of the jaw plate 172 between the pair of plates 150. When viewed from above, the jaw plate 172 may define a jaw or an inner radiused surface 173 configured for abuttingly engaging the neck extending between the pair of plates 150. The inner radiused surface 173 may extend around the neck to a point just passed the half-way point and may then divert from its path along the neck outwardly. The engaging portion 160 may also include a closure plate 174 extending across the open end of the jaw plate 172 on an opposing side of the neck. The closure plate 174 may include an inner radiused surface 175 configured for abuttingly engaging the neck. Accordingly, the jaw plate 172 and the closure plate 174, together, may extend the full circumference of the neck area between the pair of plates 150. The closure plate 174 may be pinned bolted or otherwise secured to the jaw plate 172 on each side and may be removable as required for removal of the steering mechanism 134 from the wheel assembly 132.

The jaw plate 172 may include a pair of engagement holes 176 configured for engagement by the engagement or locking pins 154. The engagement holes 176 may be arranged on either side of the neck at or near opposite sides of the neck. In some embodiments, as shown, the engagement holes 176 may be arranged 180 degrees from one another and along a centerline extending through the holes 176 and through the center of the jacking cylinder 144. The engagement holes may be arranged along a circle having a radius that is the same or similar to the radius of the row or rows of holes 152 in the pair of plates 150. As such, the engagement holes 176 may be configured to align with a corresponding pair of holes 152 in the pair of plates 150.

The engagement or locking pins 154 may be arranged in the pair of holes 176 of the jaw plate 172 and in the holes 152 in the pair of plates 150. That is, each pin 154 may extend upwardly through a lower plate of the pair of plates 150, through the jaw plate 172, and through an upper plate of the pair of plates 150. As shown, an engagement pin 154 may be provided corresponding to each of the engagement holes 176 and, as such, the jaw 172 plate may be configured for rotational engagement with the pair of plates 150 via the engagement pins 154.

The engagement pins 154 may be actuatable pins such that the jaw plate 172 may selectively engage the pair of plates 150 and selectively impart rotational motion in the pair of plates 152 and, thus, the corresponding wheel assembly 132. The engagement pins 154 may include a hydraulic cylinder 178 that may be controlled to engage and disengage the pins 154 from the holes 152 in the pair of plates 150 and the jaw plate 172. By way of controlling the hydraulic cylinder 178 the pins 154 may be selectively engaged or disengaged from the holes 150/176. In some embodiments, the hydraulic cylinder 178 may be actuatable only in conditions of rotation that allow for hole alignment. For example, upon disengaging the pins 154, the pins 154 may not be actuatable unless/until a rotation substantially equal to the radial position of the holes 152 in the pair of plates 150 is turned by the jaw plate 172. In other embodiments, no limitation on the timing of the hydraulic cylinder 178 may be included.

In some embodiments, the engagement pins 154 may be integral to steering operations and may allow for a ratcheting, stepping, and/or incremental steering operation. That is, with the engagement pin 154 in place, the actuating portion 162 of the steering system 134 may shift laterally to impart rotation in the wheel assemblies 132. Once the actuating portion 156 has passed through a selected stroke length, the actuating portion 162 may stop, the engagement pin 154 may be disengaged from the jaw plate 172 and the pair of plates 150 and the actuating portion 162 may return to its position before the selected stroke length. The engagement pin 154 may be reengaged with the jaw plate 172 and the pair of plates 150 and the process may be repeated to further rotate the wheel assembly 132. Depending on the stroke length of the actuating portion 156 and the radial spacing between the holes 152 in the plates 150, the steering or wheel assembly rotation may be performed in resulting increments. Still further, the wheel assemblies 132 may be capable of rotation that is not limited by the stroke length of the actuating portion 162 or by other features. In some embodiments, the wheel assemblies 132 may be rotated up to 90 degrees, up to 180 degrees, up to 270 degrees, or up to 360 degrees.

Figure 21:
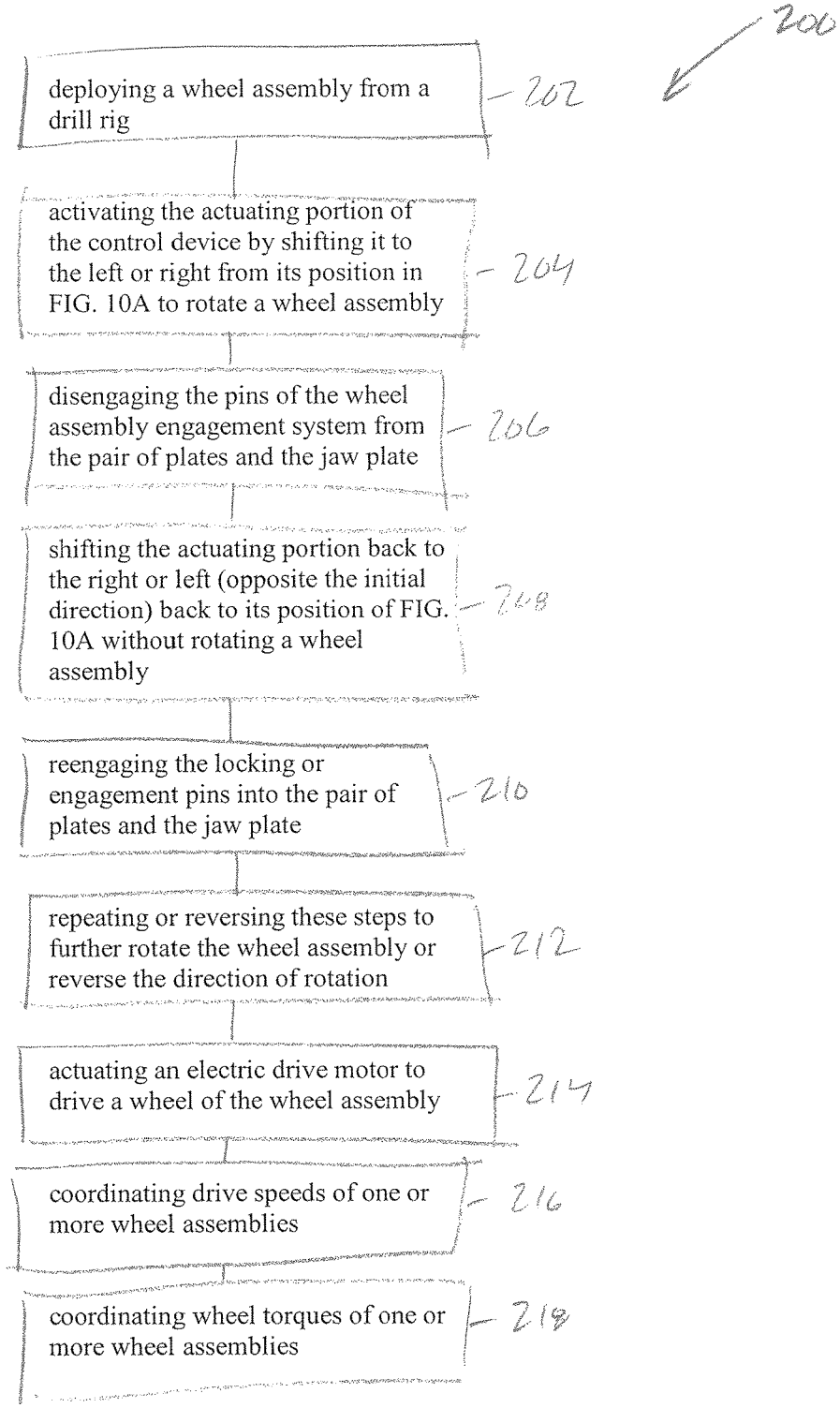
FIG. 21 shows a method of driving and/or steering a drill rig, according to one or more embodiments.

With continued reference to FIGS. 10A-10F and FIG. 21, a method may be described for rotating one or more wheel assemblies 132. As shown in FIG. 10A, the wheel assemblies 132 may be positioned in a substantially longitudinal direction. In some cases, particularly when it is desirable to move a rig 102 along a series of wells, an operator may wish turn the wheel assemblies 90 degrees with or, more likely, without moving the rig 102. By comparing FIGS. 10A and 10B, it is apparent that both wheel assemblies 132 in FIG. 10B have rotated approximately 22.5 degrees about the jacking/deployment cylinder 144 relative to that shown in FIG. 10A. The underlying method to arrive at the condition of FIG. 10B, may include activating the actuating portion 162 of the control device 156 by shifting it to the left from its position in FIG. 10A thereby extending the hydraulic rod out of the left of the barrel and retracting the hydraulic rod into the right of the barrel. The particular amount of shift may be sufficient to rotate each wheel assembly approximately 22.5 degrees. At that point, the engagement pins 154 of the wheel assembly engagement system 160 may be disengaged from the pair of plates 150 and the jaw plate 172 allowing each of these plate systems to rotate freely relative to on another. The actuating portion 162 may then be shifted back to the right thereby retracting the left rod and extending the right rod and returning the position of the jaw plate back 172 to its position of FIG. 10A without rotating the wheels 132. The locking or engagement pins 154 may then be reengaged into the pair of plates 150 and the jaw plate 172 to again rotationally couple them together. By comparing the wheel assemblies 132 of FIG. 10B to those of FIG. 10C, it is apparent that the wheel assemblies 132 of FIG. 10C have rotated yet another 22.5 degrees relative to the position of the wheel assemblies 132 of FIG. 10B. The process for creating this rotation and having the control device 156 return to the position shown in FIG. 10C may be the same or similar to that described for the transition between FIGS. 10A and 10B. The process may again be repeated to create the condition shown in FIG. 10D and the process may be repeated again to create the condition shown in FIG. 10F. FIG. 10E shows an intermediate position between the positions of FIGS. 10D and 10F and shows the actuating portion 162 shifted to the left as described above.

In one or more embodiments a method 200 of operating a drive system of a rig may include deploying a wheel assembly from a drill rig. (202) The method 200 may also include activating the actuating port of the control device by shifting it to the left or right from its position in FIG. 10A to rotate a wheel assembly. (204) For purposes of allowing for further rotation, the method may also include disengaging the pins of the wheel assembly engagement system from the pair of plates and the jaw plate (206), shifting the actuating portion back to the right or left (opposite the initial direction) back to its position of FIG. 10A without rotating a wheel assembly (208), and reengaging the locking or engagement pins into the pair of plates and the jaw plate (210). The method may also include repeating or reversing these steps to further rotate the wheel assembly or reverse the direction of rotation. (212) The method may also include actuating an electric drive motor to drive a wheel of the wheel assembly. (214) In one or more embodiments, the method may also include coordinating drive speeds of one or more wheel assemblies (216) and/or coordinating wheel torques of one or more wheel assemblies (218). It is to be appreciated that the method steps included herein may be performed in one of several available orders and the order is not to limited to the order shown in FIG. 21.

Figure 12:
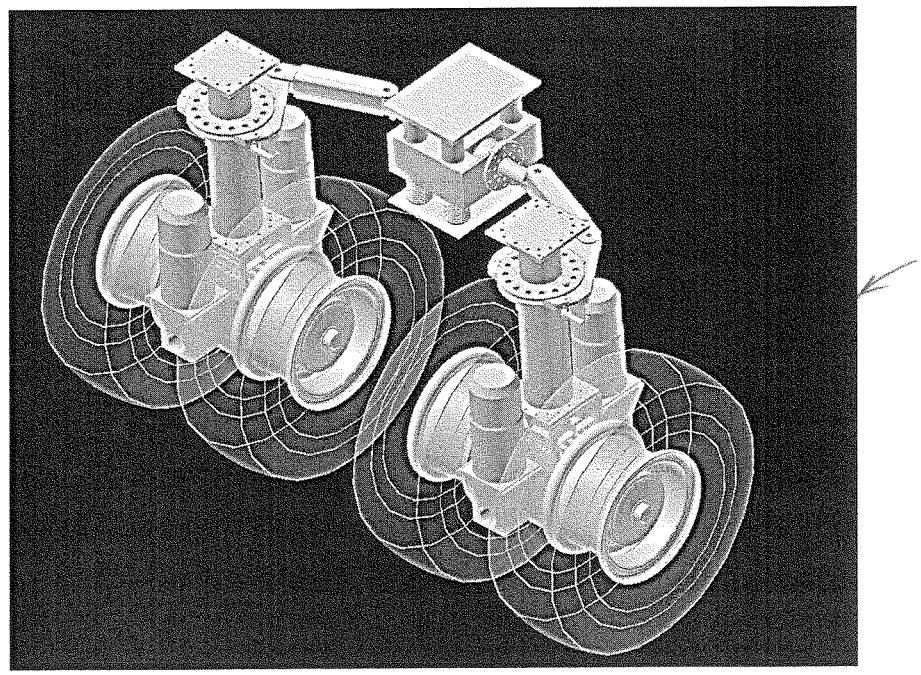
FIG. 12 is a perspective view of a pair of wheel assemblies according to one or more embodiments.
Figure 13:
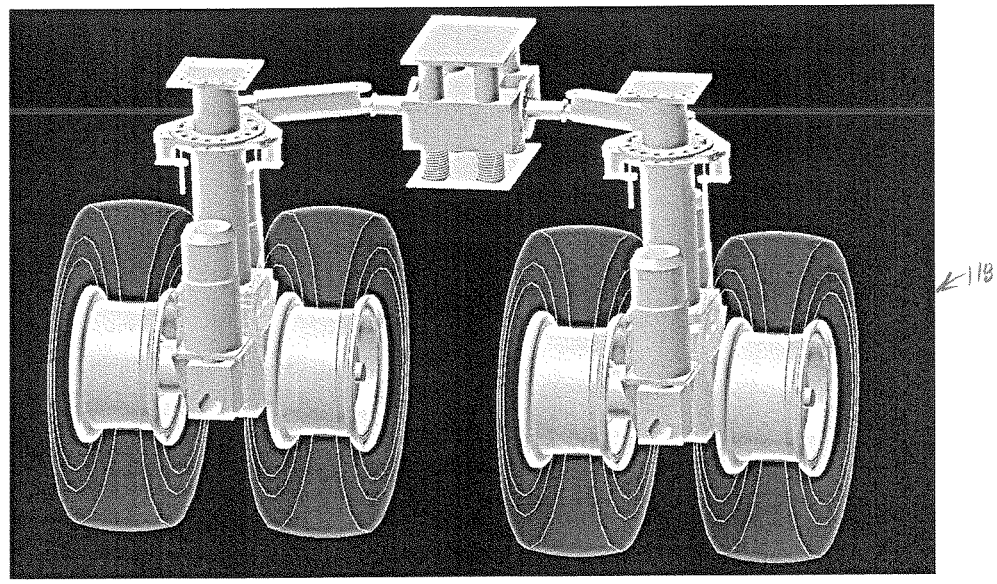
FIG. 13 is a perspective view of a pair of wheel assemblies according to one or more embodiments.
Figure 14:
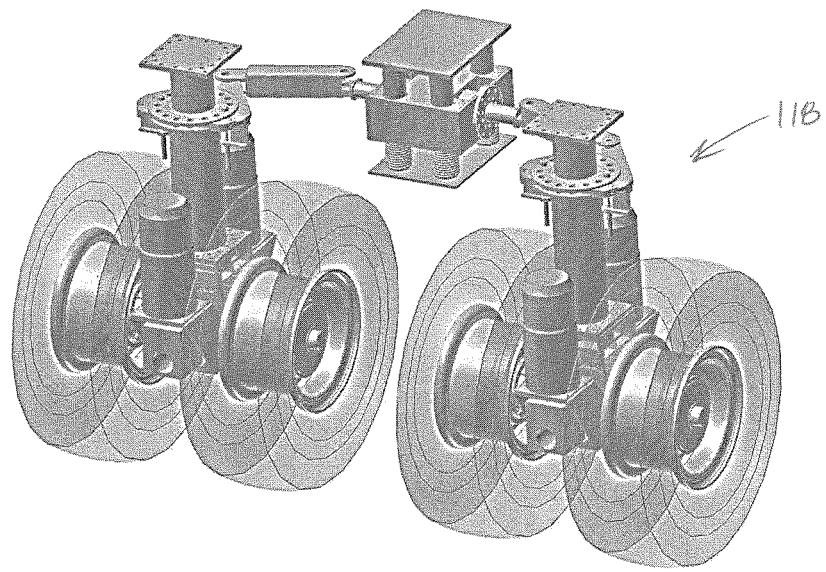
FIG. 14 is a perspective view of a pair of wheel assemblies according to one or more embodiments.
Figure 15:
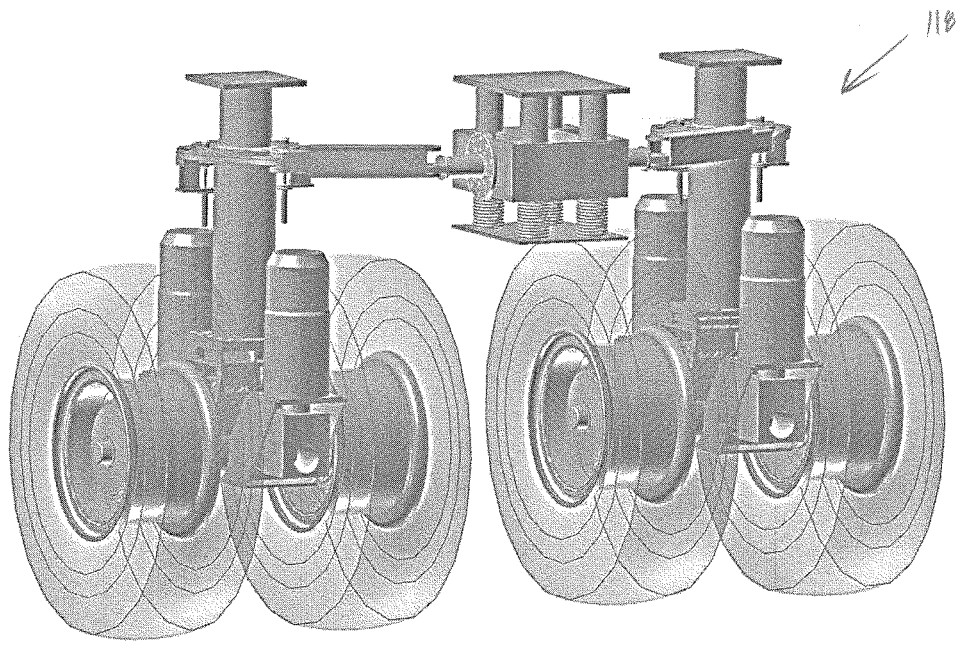
FIG. 15 is a perspective view of a pair of wheel assemblies according to one or more embodiments.
Figure 16:
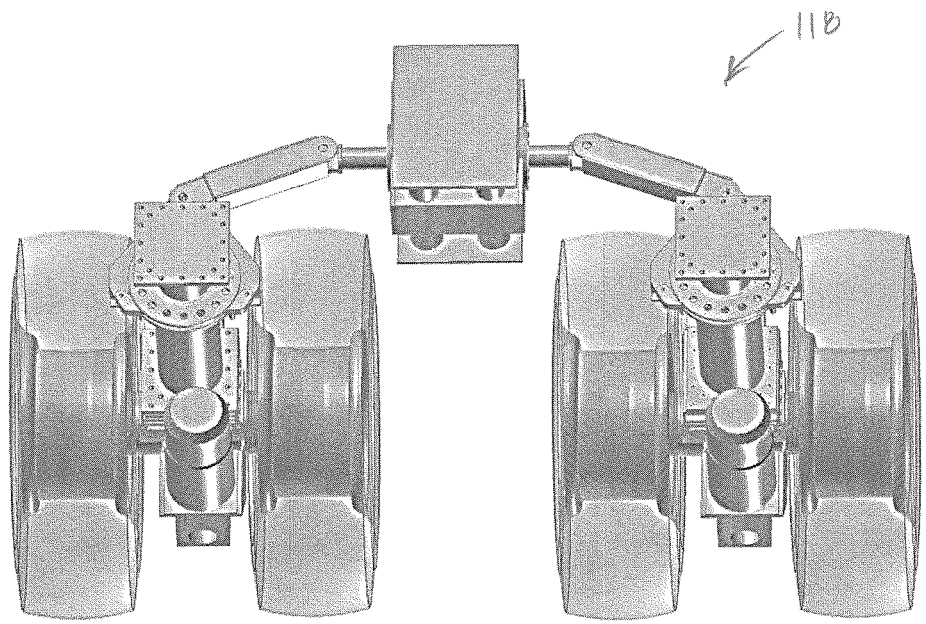
FIG. 16 is a perspective view of a pair of wheel assemblies according to one or more embodiments.
Figure 17:
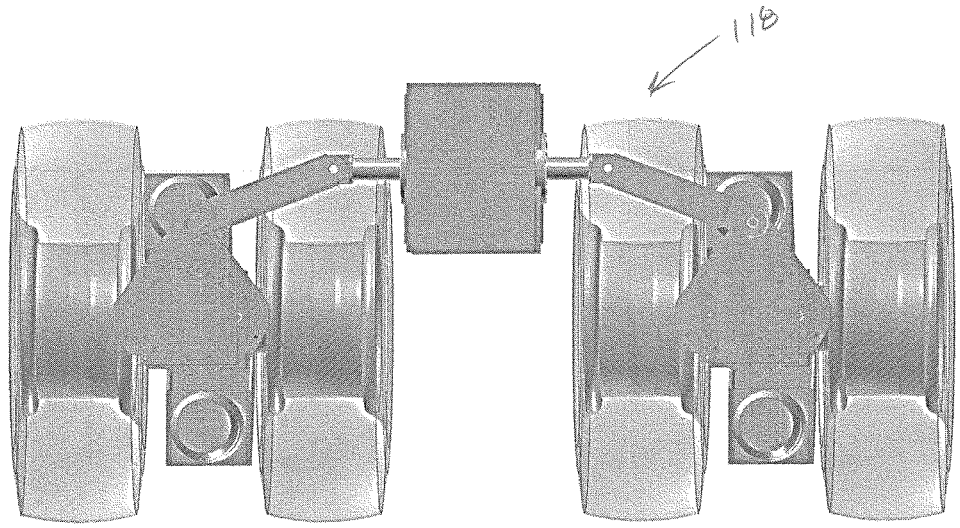
FIG. 17 is a top view of a pair of wheel assemblies according to one or more embodiments.
Figure 18:
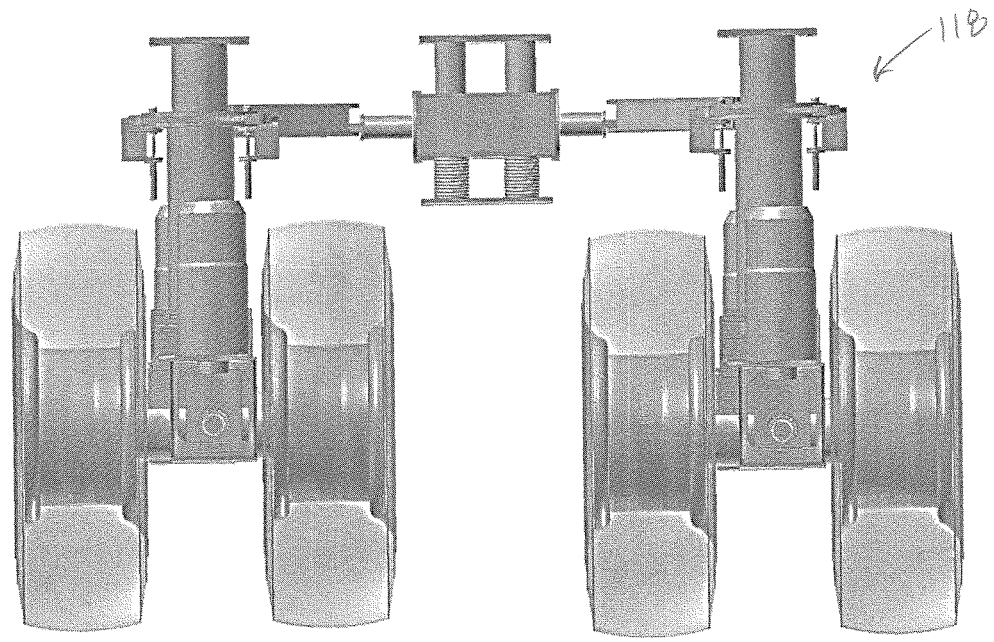
FIG. 18 is a rear view of a pair of wheel assemblies according to one or more embodiments.
Figure 19:
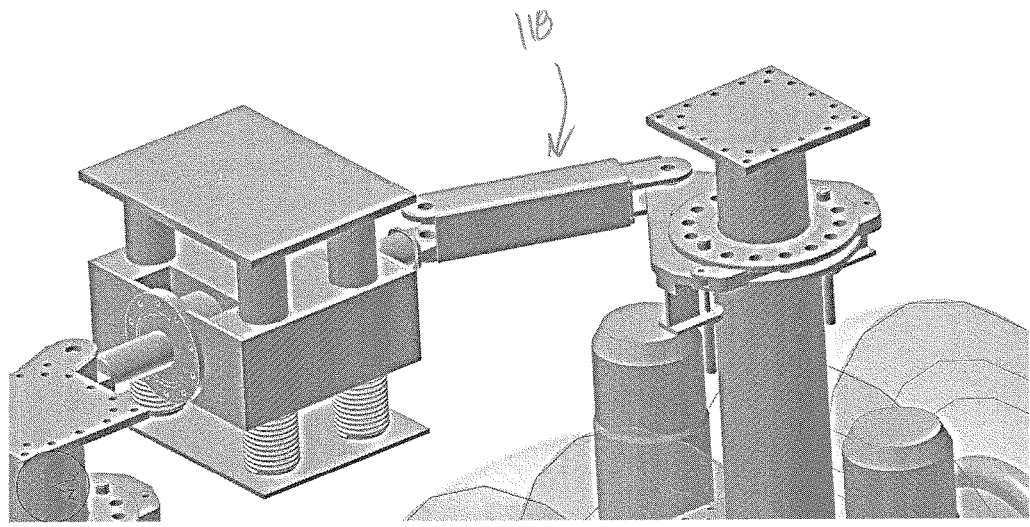
FIG. 19 is a close-up view of a steering mechanism of a pair of wheel assemblies, according to one or more embodiments.
Figure 20:
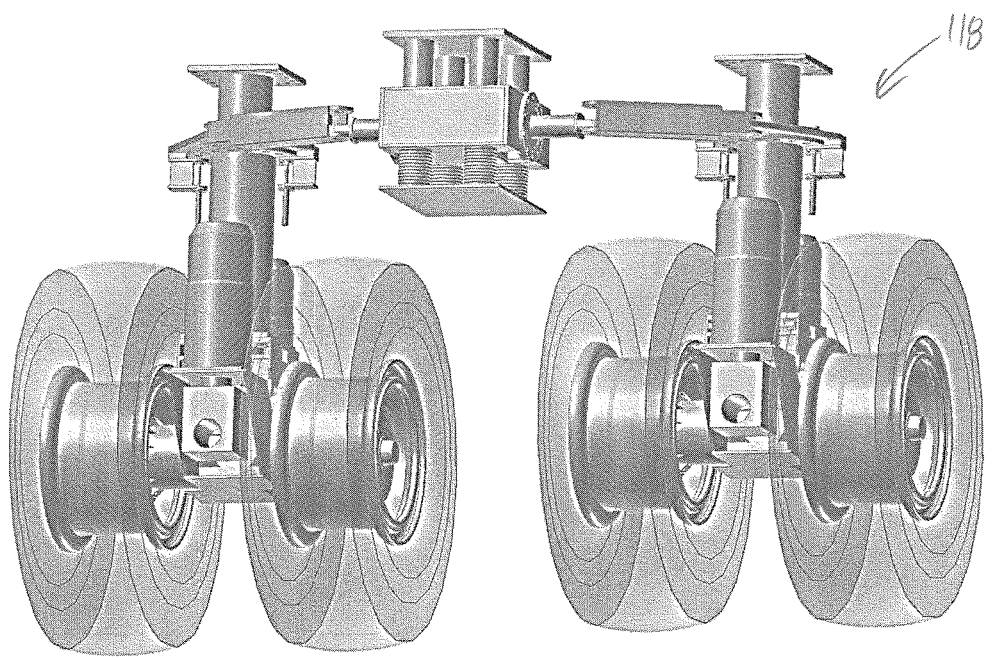
FIG. 20 is a perspective view of a pair of wheel assemblies according to one or more embodiments.

FIGS. 11-20 show additional perspective views of pairs of wheel assemblies according to embodiments of the present application.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an ingredient or element may still actually contain such item as long as there is generally no measurable effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A steering system for a drill rig, comprising:
   a wheel assembly comprising a mechanism for driving rotational motion of a wheel;
   a deployment device configuring for deploying the wheel assembly to carry the drill rig; and
   a steering mechanism configured for selective engagement with the wheel assembly and rotating the wheel assembly while the wheel assembly is engaged with the ground.

2. The steering system of claim 1, wherein the steering mechanism is configured for rotating the wheel assembly at least 90 degrees.

3. The steering system of claim 1, wherein the steering mechanism comprises an engaging pin configured to be selectively engaged.

4. The steering system of claim 3, wherein the steering mechanism includes a jaw plate configured for placement adjacent to a fixed plate on the wheel assembly wherein engaging the pin comprises extending the pin through the jaw plate and the fixed plate to prevent relative rotation.

5. The steering system of claim 1, wherein the steering mechanism provides for ratcheted steering of the wheel assembly.

6. The steering system of claim 5, wherein the ratcheted steering comprises steering in selected angular increments.

7. The steering system of claim 1, wherein the deployment device comprises a jacking cylinder.

8. The steering system of claim 7, wherein the steering mechanism is configured to engage a barrel of the jacking cylinder.

9. A steering system for a drill rig, comprising:
   a wheel assembly comprising a mechanism for driving rotational motion of a wheel;
   a deployment device configuring for deploying the wheel assembly to carry the drill rig;
   a steering mechanism configured for selective engagement with the wheel assembly and rotating the wheel assembly; and
   a control system having a double-ended cylinder, wherein lateral motion of the double-ended cylinder imparts rotation on the wheel assembly,
   wherein, the steering mechanism provides for ratcheted steering of the wheel assembly, the ratcheted steering comprising steering in selected angular increments.

10. The steering system of claim 9, further comprising a second wheel assembly and the lateral motion imparts rotation of the second wheel assembly in the same direction as the wheel assembly.

11. The steering system of claim 10, wherein the second wheel assembly comprises a second electric motor configured for driving rotational motion of a second wheel.

12. The steering system of claim 11, wherein the second electric motor and the electric motor are controlled by a variable frequency drive.

13. The steering system of claim 12, wherein the variable frequency drive is configured to cause the electric motor and the second electric motor to operate at a constant torque.

14. The steering system of claim 13, wherein the variable frequency drive is configured to cause the electric motor and the second electric motor to operate at a constant speed.

15. A drill rig with a steering system, comprising:
   a substructure having a wheelhouse;
   a drill floor arranged atop the substructure;
   a mast extending upwardly and above the drill floor; and
   a steering system arranged within the wheelhouse, comprising:
   a wheel assembly comprising a mechanism configured for driving rotational motion of a wheel;
   a deployment device configuring for deploying the wheel assembly to carry the drill rig; and
   a steering mechanism configured for selective engagement with the wheel assembly and rotating the wheel assembly while the wheel assembly is engaged with the ground.

16. The rig of claim 15, wherein the steering mechanism is configured for rotating the wheel assembly at least 90 degrees.

17. The rig of claim 15, wherein the steering mechanism comprises an engaging pin configured to be selectively engaged.

18. The rig of claim 17, wherein the steering mechanism includes a jaw plate configured for placement adjacent to a fixed plate on the wheel assembly wherein engaging the pin comprises extending the pin through the jaw plate and the fixed plate to prevent relative rotation.

* * * * *